United States Patent
Kwon et al.

(10) Patent No.: US 10,338,878 B2
(45) Date of Patent: Jul. 2, 2019

(54) DIGITAL DEVICE AND METHOD OF PROCESSING DATA THE SAME

(71) Applicant: LG ELECTRONICS INC., Seoul (KR)

(72) Inventors: Osung Kwon, Seoul (KR); Haejung Kim, Seoul (KR); Honggu Choi, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 97 days.

(21) Appl. No.: 15/260,732

(22) Filed: Sep. 9, 2016

(65) Prior Publication Data

US 2017/0075641 A1    Mar. 16, 2017

(30) Foreign Application Priority Data

Sep. 11, 2015  (KR) .......................... 10-2015-0128988

(51) Int. Cl.
  *G06F 3/02*  (2006.01)
  *G06F 3/14*  (2006.01)
  (Continued)

(52) U.S. Cl.
  CPC .......... *G06F 3/1454* (2013.01); *G06F 3/0227* (2013.01); *G06F 3/0231* (2013.01);
  (Continued)

(58) Field of Classification Search
  CPC ...... G06F 3/021; G06F 3/0219; G06F 3/0227; G06F 3/0231; G06F 3/0236;
  (Continued)

(56) References Cited

U.S. PATENT DOCUMENTS

| 2002/0131436 | A1* | 9/2002 | Suri ..................... H04L 12/2856 370/419 |
| 2004/0015985 | A1 | 1/2004 | Kweon |
| 2007/0226636 | A1 | 9/2007 | Carpenter et al. |
| 2008/0077393 | A1* | 3/2008 | Gao ........................ G06F 3/018 704/8 |

(Continued)

FOREIGN PATENT DOCUMENTS

| CN | 101350048 | 1/2009 |
| CN | 101925915 | 12/2010 |

(Continued)

OTHER PUBLICATIONS

European Search Report dated Apr. 12, 2017 issued in Application No. 16188083.6.

(Continued)

*Primary Examiner* — Nathan Danielsen
(74) *Attorney, Agent, or Firm* — KED & Associates LLP

(57) ABSTRACT

A digital device and a method of processing data in a digital device are disclosed. The digital device includes a user interface (UI) for receiving a signal for executing an application and a signal for requesting to provide a keyboard during execution of the application, a controller for transmitting a first control command for requesting the external device for keyboard input data, if it is paired with an external device having a high priority related to providing a keyboard more than the digital device, outputting keyboard input data received from the external device in response to the first control command, controlling an operation based on the output keyboard input data, and controlling the keyboard input termination, and an output unit for outputting text data corresponding to an application execution image and text data corresponding to the received keyboard input data.

16 Claims, 14 Drawing Sheets

(51) Int. Cl.
  *H04N 21/422* (2011.01)
  *H04N 21/4367* (2011.01)
  *G06F 3/023* (2006.01)
  *G06F 3/0488* (2013.01)
  *H04N 21/41* (2011.01)
  *H04N 21/4782* (2011.01)
  *H04N 5/44* (2011.01)

(52) U.S. Cl.
  CPC ....... *G06F 3/04886* (2013.01); *H04N 5/4403* (2013.01); *H04N 21/4126* (2013.01); *H04N 21/42214* (2013.01); *H04N 21/42224* (2013.01); *H04N 21/4367* (2013.01); *H04N 21/4782* (2013.01); *G09G 2370/10* (2013.01); *G09G 2370/12* (2013.01); *G09G 2370/16* (2013.01); *H04N 2005/4416* (2013.01); *H04N 2005/4425* (2013.01); *H04N 2005/4432* (2013.01)

(58) Field of Classification Search
  CPC ...... G06F 3/0238; G06F 3/048; G06F 3/0487; G06F 3/0488; G06F 3/04886–3/04897; G06F 3/1423; G06F 3/1454; G06F 3/1462; G09G 2370/10; G09G 2370/12; G09G 2370/16; H04N 5/4403; H04N 2005/4416–2005/4419; H04N 2005/4423; H04N 21/4126; H04N 21/42212–21/42214; H04N 21/42224; H04N 21/4367; H04N 21/4782
  See application file for complete search history.

(56) References Cited

U.S. PATENT DOCUMENTS

| | | | |
|---|---|---|---|
| 2009/0085871 | A1 | 4/2009 | Bhogal et al. |
| 2009/0133051 | A1 | 5/2009 | Hildreth |
| 2013/0194503 | A1 | 8/2013 | Yamashita |
| 2013/0291015 | A1 | 10/2013 | Pan |
| 2014/0111426 | A1* | 4/2014 | Inamoto ............ G06F 3/038 345/156 |
| 2014/0179230 | A1 | 6/2014 | Sydir et al. |
| 2014/0223321 | A1 | 8/2014 | Kwon et al. |
| 2014/0229847 | A1 | 8/2014 | Park |
| 2015/0106731 | A1 | 4/2015 | Matas et al. |
| 2016/0148487 | A1* | 5/2016 | Thomas ............ G06F 3/04886 340/686.6 |

FOREIGN PATENT DOCUMENTS

| | | |
|---|---|---|
| CN | 103379370 | 10/2013 |
| CN | 103703790 | 4/2014 |
| CN | 103853986 | 6/2014 |
| CN | 103858083 | 6/2014 |
| CN | 103973880 | 8/2014 |
| CN | 104050109 | 9/2014 |
| CN | 104798418 | 7/2015 |

OTHER PUBLICATIONS

European Search Report dated Dec. 23, 2016 issued in Application No. 16188083.6.

Chinese Office Action dated Apr. 20, 2019 issued in Application 201610815190.1 (full Chinese text).

* cited by examiner

FIG. 3
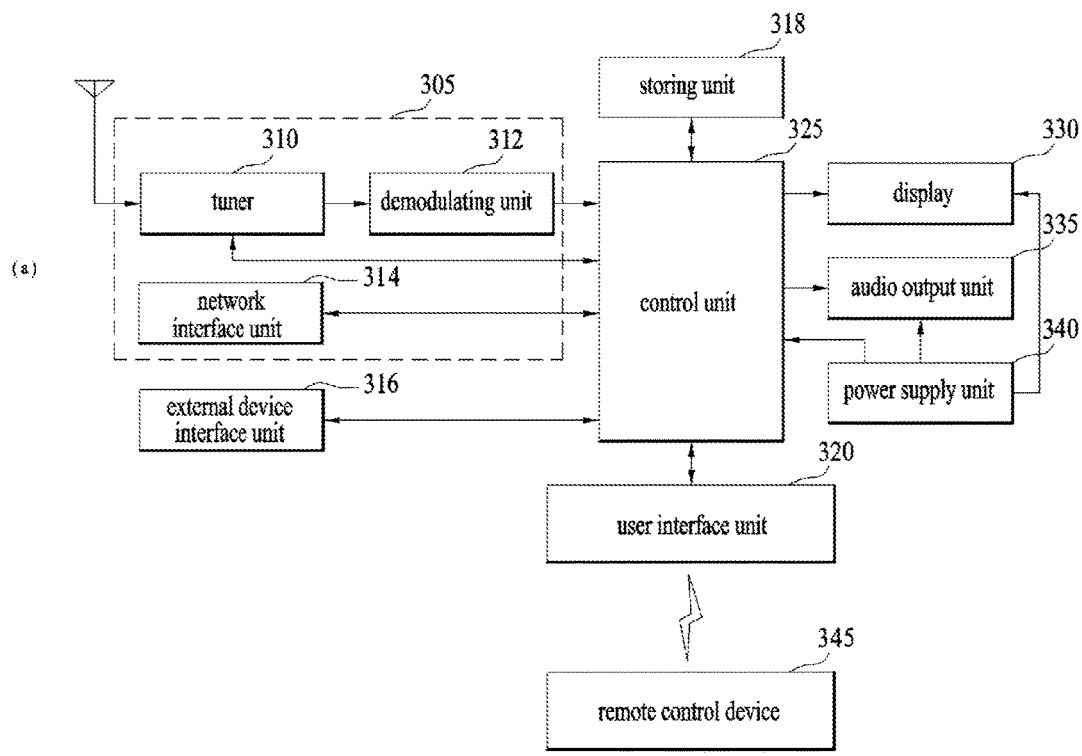
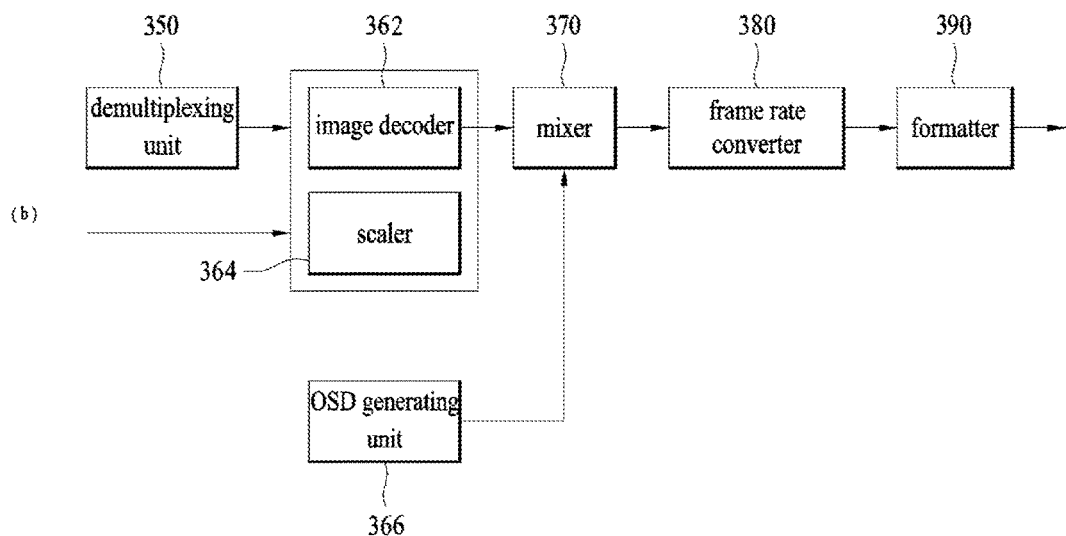

FIG. 12
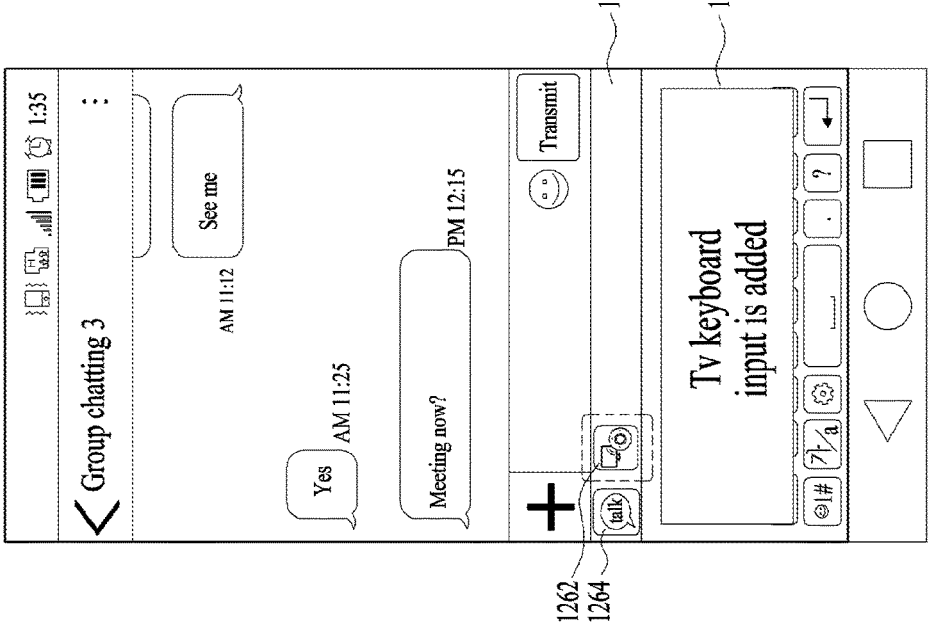
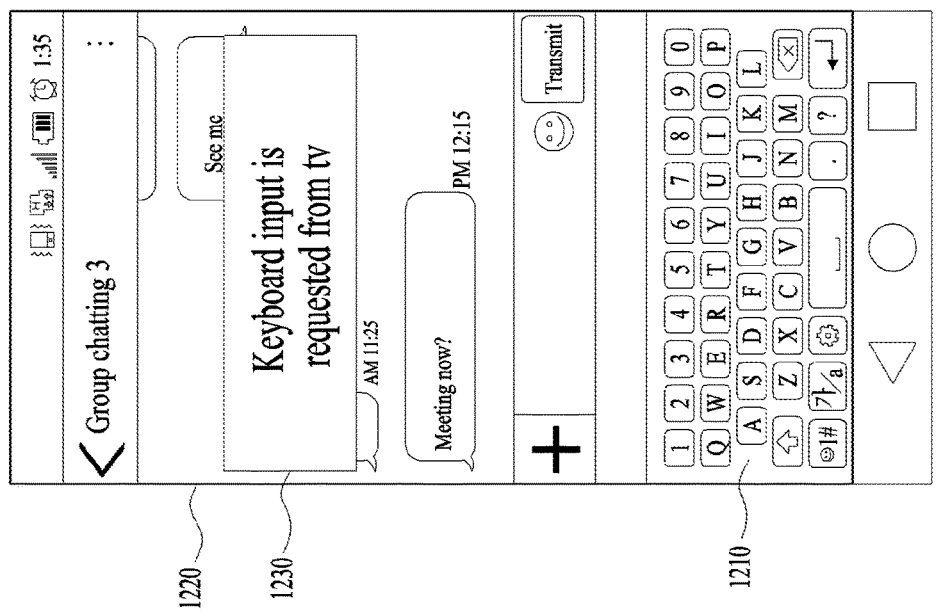

DIGITAL DEVICE AND METHOD OF PROCESSING DATA THE SAME

CROSS-REFERENCE TO RELATED APPLICATION(S)

This application claims priority under 35 U.S.C. § 119 to Korean Application No. 10-2015-0128988 filed on Sep. 11, 2015, whose entire disclosure(s) is/are hereby incorporated by reference.

BACKGROUND

1. Field

The present invention relates to a digital device, and more particularly, to data processing when keyboard input is required in a digital device.

2. Background

Ongoing developments of mobile devices such as a smart phone, a tablet PC, a wearable device and the like are remarkable as well as the developments of standing devices such as a personal computer (PC), a television (TV) and the like. Although the standing device and the mobile device have been developed individually by establishing unique fields of their own, the boundary between the established fields becomes unclear owing to the boom of the recent digital convergence.

Due to remarkable proliferation of smart televisions (TVs) or smartphones, various applications can be driven in such a smart TV or smartphone. For example, although a conventional TV can just perform volume control or channel change through a remote controller, a TV can also drive the aforementioned applications along with proliferation of a smart TV and there is an input method such as a keyboard of a personal computer (PC) according to an application. There is an increasing need to increase a size of a display due to proliferation of a smartphone and, thus, an input method through a keyboard included in a mobile terminal has been gradually changed to a method of removing the keyboard included in the mobile terminal. As such, a smart TV or a smartphone employs a method of providing a virtual keyboard instead of a method of using a physical keyboard as a separate input device like in a conventional PC in a smart TV or a smartphone. However, when the virtual keyboard is used, there is a problem in that input is inconvenient and a provided content is hidden.

BRIEF DESCRIPTION OF THE DRAWINGS

The embodiments will be described in detail with reference to the following drawings in which like reference numerals refer to like elements wherein:

FIG. 3 illustrates a block diagram for a digital TV according to another embodiment of the present invention;

FIGS. 12 to 14 illustrate diagrams illustrating a method of providing a keyboard according to a request of a digital TV by a mobile terminal according to embodiments of the present invention.

DETAILED DESCRIPTION

Description will now be given in detail according to embodiments disclosed herein, with reference to the accompanying drawings.

In general, a suffix such as "module" and "unit" may be used to refer to elements or components. Use of such a suffix herein is merely intended to facilitate description of the disclosure, and the suffix itself is not intended to give any special meaning or function. Meanwhile, such an ordinal number as 'first-', 'second-' and the like may have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings.

Figure 4:
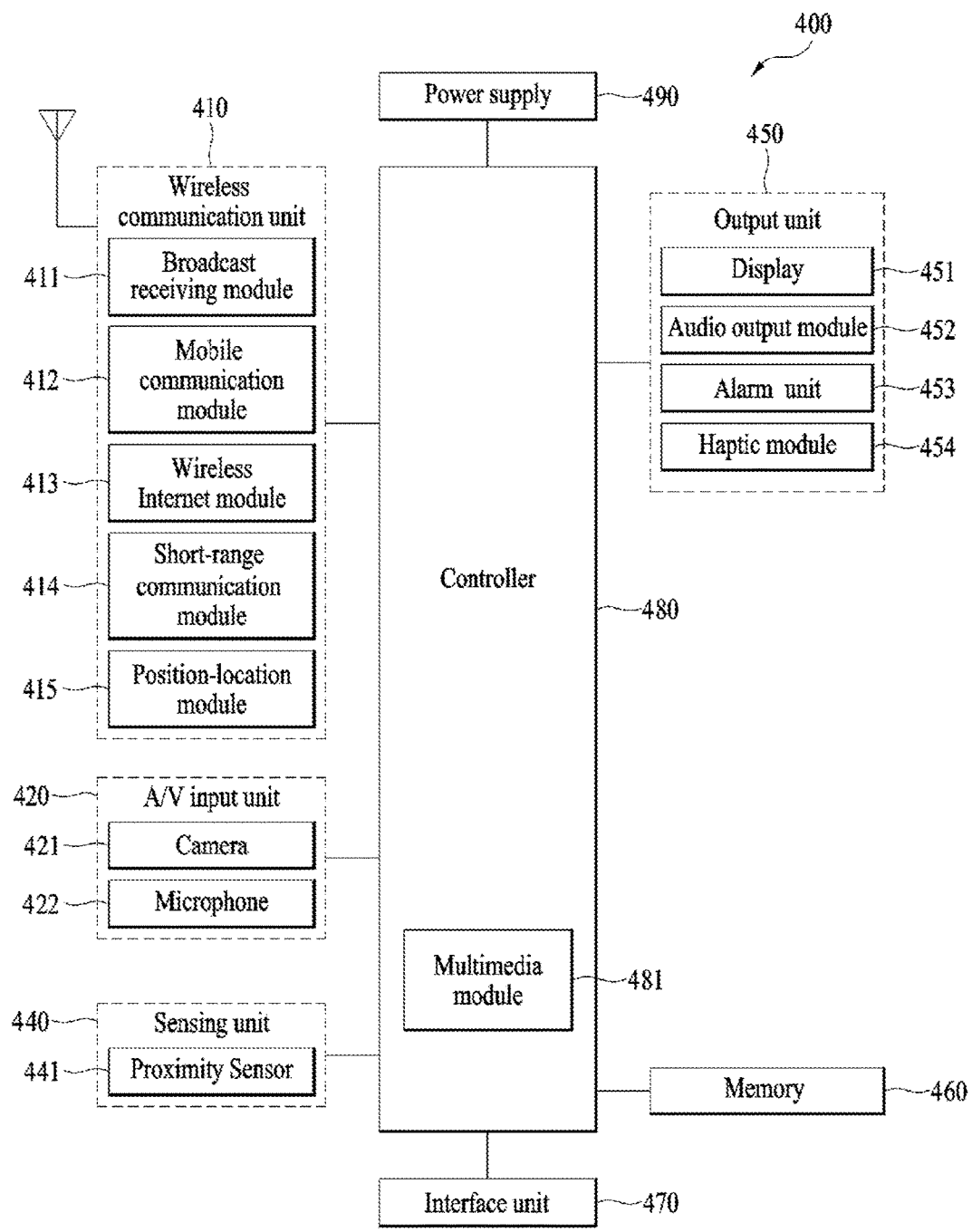
FIG. 4 illustrates a block diagram for a mobile terminal according to an embodiment of the present invention.
Figure 5:
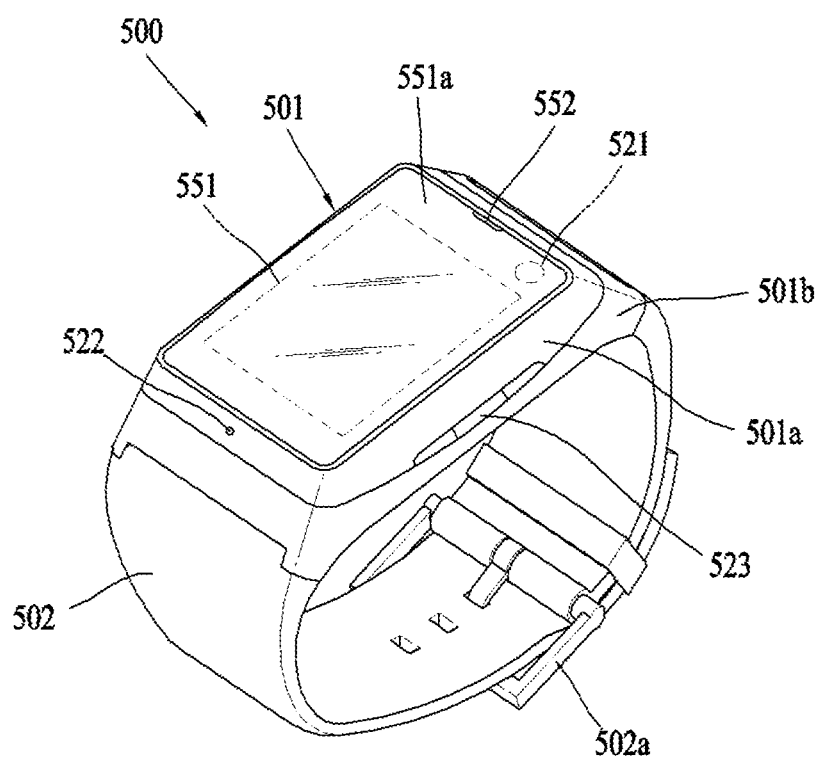
FIG. 5 illustrates a block diagram for a mobile terminal according to another embodiment of the present invention.

A digital device according to an embodiment of the present disclosure as set forth herein may be any device that can handle any one of transmitting, receiving, handling and outputting data, content, service, application, and so forth. The digital device may be connected to other digital devices through wired network or wireless network, paired or connected to an external server, and through the connections, the digital device may transmit and receive the prescribed data. Examples of the digital device may include standing devices such as a network television (TV), a Hybrid Broadcast Broadband TV (HBBTV), a smart TV, Internet Protocol TV (IPTV), and personal computer (PC), or mobile (or handheld) devices such as a Personal Digital Assistant (PDA), a smart phone, a tablet PC, or an Notebook computer. For convenience of description, in this disclosure, the Digital TV (DTV) is used in FIGS. 2-3 and the mobile device is used in FIGS. 4-5 depicting the digital device. Further, the digital device in this disclosure may be referred to configuration comprising only a panel, set-top box (STB), or a SET including the entire system.

Moreover, the wired or wireless network described in this disclosure may refer to various pairing methods, standard telecommunication network protocol methods which are supported for transmitting and receiving data between digital devices or between digital device and the external server.

The wired or wireless network also includes various telecommunication network protocols supported now as well as in the future. Examples of the wired or wireless network include wired networks supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless networks supported by various standards including Bluetooth™, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the disclosure referring simply to the digital device can include a standing device or a mobile device depending on the context, and when it is not referred to a specific device, the digital device referred in this disclosure refers to both standing and mobile device. Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means supporting a handwriting input, a touch-screen, and a spatial remote control.

Furthermore, the digital device may use a standard operating system (OS), however, the digital device described in this disclosure and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes High Definition Multimedia Interface (HDMI), game devices such as Playstation or X-Box, smart phone, tablet PC, printing device such as pocket photo, digital devices such as smart TV and blue-ray device.

The "server" referred to as in this disclosure, includes a digital device or a system capable of transmitting and receiving data to and from a client, and may also be referred to as a processor. For example, the server may be servers providing services such as a portal server providing a web page, a web content or a web service, an advertising server providing advertising data, a content server, a Social Network Service (SNS) server providing a SNS service, a service server providing a service by a manufacturer, a Multichannel Video Programming Distributor (MVPD) providing a Video on Demand (VoD) or a streaming service, and a service server providing pay services. When an application is described for the convenience of explanation, the meaning of disclosure in the context may include services as well as applications.

Figure 1:
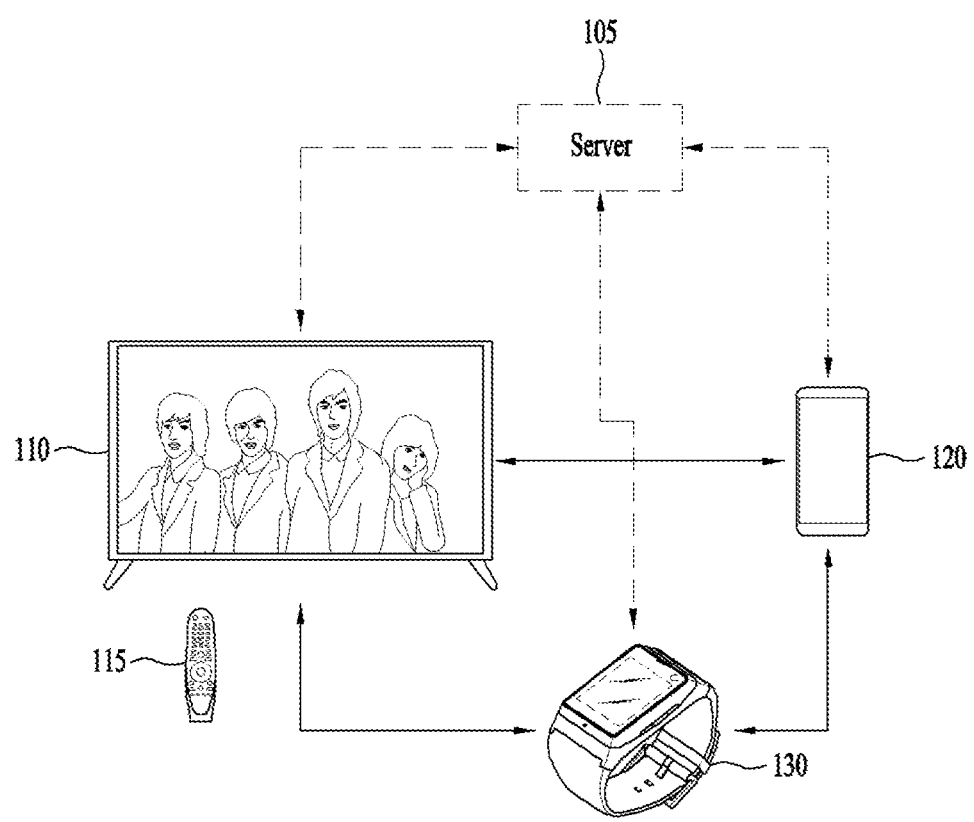
FIG. 1 illustrates a schematic diagram for a service system according to an embodiment of the present invention.

FIG. 1 illustrates a schematic diagram of a service system according to one embodiment of a present disclosure.

Referring to FIG. 1, the service system may include a server 105 and a DTV 110, basically. Here, the DTV 110 may be replaced to a mobile device (e.g., a smart phone) 120 or a wearable device 130. Or, the service system further includes the mobile device 120 or the wearable device 130. And, the DTV 110 can be controlled by a controlling means including a dedicated remote controller 115, and the like.

The digital device includes a user interface (UI) for receiving a signal for executing an application and a signal for requesting to provide a keyboard during execution of the application, a controller for transmitting a first control command for requesting the external device for keyboard input data, if it is paired with an external device having a high priority related to providing a keyboard more than the digital device, outputting keyboard input data received from the external device in response to the first control command, controlling an operation based on the output keyboard input data, and controlling the keyboard input termination, and an output unit for outputting text data corresponding to an application execution image and text data corresponding to the received keyboard input data.

Figure 2:
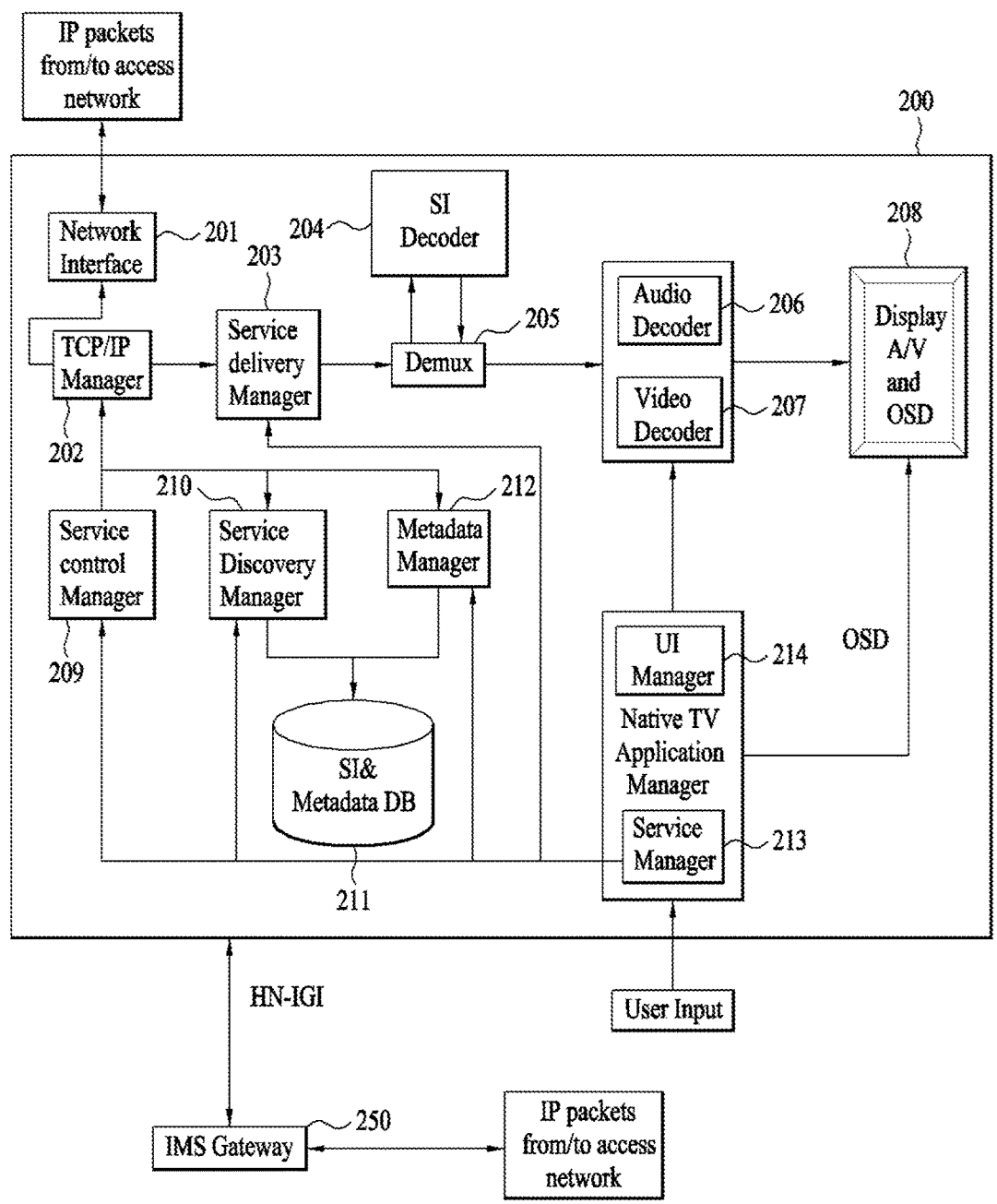
FIG. 2 illustrates a block diagram for a digital device according to an embodiment of the present invention.

FIG. 2 illustrates a block diagram of the digital device according to one embodiment of a present disclosure.

In the disclosure, the digital device 200 can correspond to the DTV 110 shown in FIG. 1.

The digital device 200 can include a network interface unit 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display A/V (Audio/Video) and OSD (On Screen Display) module 208, a service control manager 209, a service discovery manager 210, a SI & metadata database (DB) 211, a metadata manager 212, a service manager 213, a UI (User Interface) manager 214, etc.

The network interface unit (or a receiving unit) 201 can receive or transmit IP packets or IP datagrams (hereinafter, referred as IP packets) through an accessed network. As an example, the network interface unit 201 can receive service, application, content, etc., from a service provider through the network.

The TCP/IP manager 202 is involved in a packet delivery of IP packets transmitted to the digital device 200 and IP packets transmitted from the digital device 200 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use a Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RTP, and transmit the parsed data packet to the demultiplexer 205 or store the parsed data packet in the SI & metadata DB 211 under the control of the service manager 213. The service delivery manager 203 can provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204.

The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can store the decoded SI data in the SI & metadata DB 211. The SI data stored in the SI & metadata DB 211 can be read and extracted by a component which requires the SI data according to user request, for example.

The audio decoder 206 and the video decoder 207 can decode the demultiplexed audio and video data, respectively. The decoded audio data and video data can be displayed on a display screen of the display unit 208.

The application manager can include the service manager 213 and the UI manager 214, for example. The application manager can perform a function of the controller of the digital device 200. In other words, the application manager can administrate the overall state of the digital receiver 200, provides a UI, and manage other mangers.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212.

The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 2405 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal.

The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialized and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc.

The SI & metadata DB 211 can be implemented using a Non-Volatile RAM (NVRAM) or a Flash memory, and the like.

An IMS gateway 250 can be a gateway that collects functions required to access IPTV services based on an IMS.

FIG. 3a illustrates a block diagram illustrating a digital device according to other embodiment of the present disclosure.

The digital device according to another embodiment of the present disclosure can include a broadcast receiving unit 305, an external device interface 316, a storage unit 318, a user input interface 320, a controller 325, a display unit 330, an audio output unit 335, a power supply unit 340, and a photographing unit (not shown). Here, the broadcast receiving unit 305 can include at least one of tuner 310 and a demodulator 312, and a network interface 314. The broadcast receiving unit 305 can include the tuner 310 and the demodulator 312 without the network interface 314, or can include the network interface 314 without the tuner 310 and the demodulator 312. The broadcast receiving unit 305 can include a multiplexer (not shown) to multiplex a signal, which is demodulated by the demodulator 312 via the tuner 310, and a signal received through the network interface 314. In addition, the broadcast receiving unit 305 can include a demultiplexer (not shown) and demultiplex a multiplexed signal, a demodulated signal, or a signal received through the network interface 314.

The tuner 310 can receive a radio frequency (RF) broadcast signal, through an antenna, by tuning to a channel selected by the user or all previously stored channels. Also, the tuner 310 can convert the received RF broadcast signal into an IF (Intermediate Frequency) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 310 can process both the digital broadcast signal and the analog broadcast signal. The analog baseband image or a voice signal output from the tuner 310 can be directly input to the controller 325.

The tuner 310 can receive a RF broadcast signal of single carrier or multiple carriers. The tuner 310 can sequentially tune and receive a RF broadcast signal of all broadcast channel stored by a channel memory function among RF broadcast signal received through an antenna to. And, the tuner 310 can convert the received RF broadcast signal into the DIF.

The demodulator 312 receives the DIF signal, demodulates the received DIF signal, and performs a channel decoding, etc. For this, the demodulator 312 includes a trellis decoder, a de-interleaver, a Reed-Solomon decoder, etc., or includes a convolution decoder, the de-interleaver, the Reed-Solomon decoder, etc.

The demodulator 312 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 312 can be input to the controller 325. The controller 325 can control demultiplexing, processing audio/video signal, etc. Furthermore, the controller 325 can control outputting video through the display unit 330 and outputting audio through the audio output unit 335.

The external device interface 316 can provide an environment for interfacing external devices with the digital device. To implement this, the external device interface 316 can include an A/V input/output unit (not shown) or an RF communication unit (not shown).

The external device interface 316 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 316 transfer a signal to the controller 325 of the digital device. The signal includes image data, video data, audio data which is input through an external device. The external device is connected to the digital device. The controller 325 can control to output the signal including the processed image data, the processed video data and the processed audio data to the connected external device. For this, the external device interface 316 can further include an A/V input/output unit or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital device can be networked with other electronic apparatuses according to communication protocols such as Bluetooth, RFID, IrDA, UWB, ZigBee, and DLNA, for example.

Also, the external device interface 316 can connect a STB via at least one interface described above, and perform an input/output operation with the connected STB.

Meanwhile, the external device interface 316 can receive application or application list included in a nearby external device, and can transfer the application or the application list to the controller 325 or the storage unit 318.

The network interface 314 may provide an interface for connecting the digital device to wired/wireless networks.

Using the network interface 314, the digital receiver can transmit/receive data to/from other users or other electronic apparatuses or access a predetermined web page through a network connected thereto or another network linked to the connected network.

The network interface 314 can selectively receive a desired application from among publicly open applications through a network.

Also, the network interface 314 can select a wanted application among open applications and the selected application via a network.

The storage unit 318 may store programs for signal processing and control and store a processed video, audio or data signal.

In addition, the storage unit 318 may execute a function of temporarily storing a video, audio or data signal input from the external device interface 316 or the network interface 314. The storage unit 318 may store information about a predetermined broadcast channel through a channel memory function.

The storage unit 318 can store an application or a list of applications input from the external device interface 316 or the network interface 314.

The storage unit 318 may store various platforms which will be described later.

The storage unit 318 can include storage media of one or more types, such as a flash memory type, a hard disk type, a multimedia card micro type, a card type memory (e.g., SD or XD memory), RAM, EEPROM, etc. The digital device may reproduce content files (e.g., a video file, a still image file, a music file, a text file, an application file, etc.) and provide them to the user.

While FIG. 3a illustrates an embodiment in which the storage unit 318 is separated from the controller 325, the configuration of the digital device is not limited thereto and the storage unit 318 may be included in the controller 325.

The user input interface 320 may transmit a signal input by the user to the controller 325 or deliver a signal output from the controller 325 to the user.

For example, the user input interface 320 can receive control signals such as a power on/off signal, a channel selection signal, an image setting signal, etc. from the remote controller or transmit control signals of the controller 325 to the remote controller according to various communication schemes such as RF communication, IR communication, and the like.

The user input interface 320 can transmit control signals input through a power key, a channel key, a volume key, and a local key (not shown) of a set value to the controller 325.

The user input interface 320 can transmit a control signal input from a sensing unit (not shown) which senses a gesture of the user or deliver a signal of the controller 325 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 325 can generate and output a signal for video or audio output by demultiplexing streams input through the tuner 310, the demodulator 312 or the external device interface 316 or processing demultiplexed signals.

A video signal processed by the controller 325 can be input to the display unit 330 and displayed as an image through the display unit 330. In addition, the video signal processed by the controller 325 can be input to an external output device through the external device interface 316.

An audio signal processed by the controller 325 can be applied to the audio output unit 335. Otherwise, the audio signal processed by the controller 325 can be applied to an external output device through the external device interface 316.

The controller 325 may include a demultiplexer and an image processor, which are not shown in FIG. 3a.

The controller 325 can control the overall operation of the digital device. For example, the controller 325 can control the tuner 310 to tune to an RF broadcast corresponding to a channel selected by the user or a previously stored channel.

The controller 325 can control the digital device according to a user command input through the user input interface 320 or an internal program. Particularly, the controller 325 can control the digital device to be linked to a network to download an application or application list that the user desires to the digital device.

For example, the controller 325 may control the tuner 310 to receive a signal of a channel selected in response to a predetermined channel selection command received through the user input interface 320. In addition, the controller 325 may process a video, audio or data signal corresponding to the selected channel. The controller 325 may control information on a channel selected by the user to be output with a processed video or audio signal through the display unit 330 or the audio output unit 335.

Alternatively, the controller 325 may control a video signal or an audio signal received from an external apparatus, for example, a camera or a camcorder through the external device interface 316 to be output through the display unit 330 or the audio output unit 335 according to an external device image reproduction command received through the user input interface 316.

The controller 325 can control the display unit 330 to display images. For example, the controller 325 can control a broadcast image input through the tuner 310, an external input image received through the external device interface 316, an image input through the network interface 314, or an image stored in the storage unit 318 to be displayed on the display unit 330. Here, an image displayed on the display unit 330 can be a still image or video, and it can be a 2D or 3D image.

The controller 325 can control reproduction of content. Here, the content may be content stored in the digital device, received broadcast content, or content input from an external device. The content may include at least one of a broadcast image, an external input image, an audio file, a still image, an image of a linked web, and a text file.

The controller 325 can control display of applications or an application list, downloadable from the digital device or an external network, when an application view menu is selected.

The controller 325 can control installation and execution of applications downloaded from an external network in addition to various UIs. Furthermore, the controller 325 can control an image relating to an application executed by user selection to be displayed on the display unit 330.

The digital device may further include a channel browsing processor (not shown) which generates a thumbnail image corresponding to a channel signal or an external input signal.

The channel browsing processor can receive a stream signal (e.g., TS) output from the demodulator 312 or a stream signal output from the external device interface 316 and extract an image from the received stream signal to generate a thumbnail image. The generated thumbnail image can be directly input to the controller 325 or can be encoded and then input to the controller 325. Also, the thumbnail image can be coded into a stream and then applied to the controller 325. The controller 325 can display a thumbnail list including a plurality of thumbnail images on the display unit 330 using thumbnail images input thereto. The thumbnail images included in the thumbnail list can be updated sequentially or simultaneously. Accordingly, the user can conveniently check content of a plurality of broadcast channels.

The display unit 330 may convert a video signal, a data signal, and an OSD signal processed by the controller 325 and a video signal and a data signal received from the external device interface 316 into RGB signals to generate driving signals.

The display unit 330 may be a PDP, an LCD, an OLED, a flexible display, a 3D display or the like.

The display unit 330 may be configured as a touch-screen and used as an input device rather than an output device.

The audio output unit 335 receives a signal audio-processed by the controller 325, for example, a stereo signal, a 3.1 channel signal or a 5.1 channel signal, and outputs the received signal as audio. The audio output unit 335 can be configured as one of various speakers.

The digital device may further include the sensing unit for sensing a gesture of the user, which includes at least one of a touch sensor, a voice sensor, a position sensor, and an action sensor, as described above. A signal sensed by the sensing unit can be delivered to the controller 325 through the user input interface 320.

The digital device may further include the photographing unit for photographing the user. Image information acquired by the photographing unit can be supplied to the controller 325.

The controller 325 may sense a gesture of the user from an image captured by the photographing unit or a signal sensed by the sensing unit, or by combining the image and the signal.

The power supply unit 340 may supply power to the digital device.

Particularly, the power supply unit 340 can supply power to the controller 325 which can be implemented as a system-on-chip (SoC), the display unit 330 for displaying images, and the audio output unit 335 for audio output.

The power supply unit 340 can include a converter (not shown) converting a alternating source into a direct source. For example, when the display unit 330 is implemented as a liquid panel including a plurality of backlight lamps, the power supply unit 340 can include an inverter (not shown) which is capable of performing a Pulse Width Modulation (PWM) for changing or dimming a luminance.

The remote control device 345 may transmit user input to the user input interface 320. To achieve this, the remote controller can use Bluetooth, RF communication, IR communication, UWB, ZigBee, etc.

In addition, the remote control device 345 can receive audio, video or data signal output from the user input interface 320 and display the received signal or output the same as audio or vibration.

The above-mentioned digital device can be a digital broadcast receiver which is capable of processing a digital broadcast signal of a fixed or mobile ATSC method, or a digital broadcast signal of a DVB method.

FIG. 3b illustrates a block diagram illustrating a detailed configuration of a controller shown in FIG. 2 to FIG. 3a according to one embodiment of a present disclosure.

The digital receiver according to the present disclosure may include a demultiplexer 350, an image processor, an OSD generator 366, a mixer 370, a frame rate converter (FRC) 385, and an output formatter (or a 3D formatter) 390.

The demultiplexer 350 can demultiplex an input stream signal into an MPEG-2 TS image, an audio signal and a data signal, for example.

The image processor can process a demultiplexed image signal using a video decoder 362 and a scaler 364.

The video decoder 362 can decode the demultiplexed image signal and the scaler 364 can scale the resolution of the decoded image signal such that the image signal can be displayed.

The video decoder 362 can support various standards. For example, the video decoder 362 can perform a function as an MPEG-2 decoder when the video signal is coded in an MPEG-2 standard. The video decoder 362 can perform a function as a H.264/H.265 decoder when the video signal is coded in a digital multimedia broadcasting (DMB) method or the H. 264/H. 265 standard method.

The image signal decoded by the image processor may be input to the mixer 364.

The OSD generator 366 may generate OSD data automatically or according to user input. For example, the OSD generator 366 may generate data to be displayed on the screen of an output unit in the form of an image or text on the basis of a control signal of a user input interface. OSD data generated by the OSD generator 366 may include various data such as a UI image of the digital receiver, various menu screens, widget, icons, and information on ratings. The OSD generator 366 can generate a caption of a broadcast image or data for displaying EPG based broadcast information.

The mixer 370 may mix the OSD data generated by the OSD generator 366 and the image signal processed by the image processor. The mixer 370 may provide the mixed signal to the output formatter 390. By mixing the decoded image signal and the OSD data, OSD may be overlaid on a broadcast image or external input image.

The FRC 380 may convert a frame rate of input video. For example, the frame rate converter 380 can convert the frame rate of an input 60 Hz video to a frame rate of 120 Hz or 240 Hz, according to an output frequency of the output unit. The FRC 380 may be bypassed when frame conversion is not executed.

The output formatter 390 may change the output of the FRC 380, which is input thereto, into a form suitable for the output format of the output unit. For example, the output formatter 390 can output an RGB data signal. In this case, this RGB data signal can be output according to low voltage differential signaling (LVDS) or mini-LVDS. When a 3D image signal output from the FRC 380 is input to the 3D formatter 760, the output formatter 390 can format the 3D image signal such that the 3D image signal is matched to the output format of the output unit, to thereby support a 3D service.

An audio processor (not shown) may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals.

Furthermore, the audio processor can control base, treble and volume.

In addition, a data processor (not shown) can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present disclosure, each component can be integrated, added or omitted according to a capability of the digital device which is actually implemented. That is, if necessary, at least two components are united into a single component or a single component is divided into at least two components. Also, a function performed by each block explains an embodiment of the present disclosure, the specific operation or device is not limited to a scope of the present disclosure.

Meanwhile, the digital device can be an image signal processing device for performing a signal of an input image or an image stored in the device. Other example of the image signal device can be a STB which does not include the display unit and the audio output unit shown, a DVD player, a Blu-ray player, a game device, a computer, etc.

FIG. 4 illustrates a block diagram illustrating a digital device according to another embodiment of the present disclosure.

FIGS. 2 through 3 explained above refers to a standing device as according to an embodiment of the digital device, but FIGS. 4 through 5 refer to a mobile device as another embodiment of the digital device.

With reference to FIG. 4, the mobile terminal 400 can include a wireless communication unit 410, an A/V input unit 420, a user input unit 430, a sensing unit 440, an output unit 450, a memory 460, an interface unit 470, a controller 480, and a power supply unit 490.

The wireless communication unit 410 typically includes one or more components which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, and a position-location module 415.

The broadcast receiving module 411 receives a broadcast signal and/or broadcast associated information from an external broadcast managing server via a broadcast channel. The broadcast channel may include a satellite channel and a terrestrial channel. At least two broadcast receiving modules 411 can be provided in the mobile terminal 400 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 412.

The broadcast associated information can be implemented in various forms. For instance, broadcast associated information may include an electronic program guide (EPG) and an electronic service guide (ESG).

The broadcast receiving module 511 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 511 can be configured to be suitable for other broadcasting systems as well as the above-noted digital broadcasting systems.

The broadcast signal and/or broadcast associated information received by the broadcast receiving module 411 may be stored in a suitable device, such as the memory 460.

The mobile communication module 412 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 413 supports Internet access for the mobile terminal 400. This module may be internally or externally coupled to the mobile terminal 400. The wireless Internet technology can include Wi-Fi, Wibro, Wimax, or HSDPA.

The short-range communication module 514 facilitates relatively short-range communications. Suitable technologies for implementing this module include RFID, IrDA, UWB, as well as the networking technologies commonly referred to as Bluetooth™ and ZigBee™, to name a few.

The position-location module 415 identifies or otherwise obtains the location of the mobile terminal 400. According to one embodiment, this module may be implemented with a global positioning system (GPS) module. The GPS module 415 can precisely calculate current 3-dimensional (3D) position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 415 can calculate speed information by continuously calculating a real-time current location.

With continued reference to FIG. 4, the A/V input unit 420 is configured to provide audio or video signal input to the mobile terminal 400. As shown, the A/V input unit 420 includes a camera 421 and a microphone 422. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or can be transmitted to an external recipient via the wireless communication unit 410. Optionally, at least two cameras 421 can be provided in the mobile terminal 400 according to the environment of usage.

The microphone 422 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 412 in a call mode. The microphone 422 typically includes assorted noise removing algorithms to remove noise generated in the course of receiving the external audio signal.

The user input unit 430 generates input data responsive to user manipulation of an associated input device or devices. Examples of such devices include a keypad, a dome switch, a touchpad (e.g., static pressure/capacitance), a jog wheel, and a jog switch.

The sensing unit 440 provides sensing signals for controlling operations of the mobile terminal 400 using status measurements of various aspects of the mobile terminal. For instance, the sensing unit 440 may detect an open/closed status of the mobile terminal 400, the relative positioning of components (e.g., a display and keypad) of the mobile terminal 400, a change of position (or location) of the mobile terminal 400 or a component of the mobile terminal 400, a presence or absence of user contact with the mobile terminal 400, and an orientation or acceleration/deceleration of the mobile terminal 400. As an example, a mobile terminal 400 configured as a slide-type mobile terminal is considered. In this configuration, the sensing unit 440 may sense whether a sliding portion of the mobile terminal is open or closed. According to other examples, the sensing unit 440 senses the presence or absence of power provided by the power supply unit 490, and the presence or absence of a coupling or other connection between the interface unit 470 and an external device. According to one embodiment, the sensing unit 440 can include a proximity sensor 441.

The output unit 450 generates output relevant to the senses of sight, hearing, and touch. Furthermore, the output unit 450 includes the display 451, an audio output module 452, an alarm unit 453, a haptic module 454, and a projector module 455.

The display 451 is typically implemented to visually display (output) information associated with the mobile terminal 400. For instance, if the mobile terminal is operating in a phone call mode, the display will generally provide a UI or GUI which includes information associated with placing, conducting, and terminating a phone call. As another example, if the mobile terminal 400 is in a video call mode or a photographing mode, the display 451 may additionally or alternatively display images which are associated with these modes, the UI or the GUI.

The display module 451 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 500 may include one or more of such displays.

Some of the displays can be implemented in a transparent or optical transmittive type, i.e., a transparent display. A representative example of the transparent display is the TOLED (transparent OLED). A rear configuration of the display 451 can be implemented as the optical transmittive type as well. In this configuration, a user can see an object located at the rear of a terminal body on a portion of the display 451 of the terminal body.

At least two displays 451 can be provided in the mobile terminal 400 in accordance with one embodiment of the mobile terminal 400. For instance, a plurality of displays can be arranged to be spaced apart from each other or to form a single body on a single face of the mobile terminal 400. Alternatively, a plurality of displays can be arranged on different faces of the mobile terminal 400.

If the display 451 and a sensor for detecting a touch action (hereinafter called 'touch sensor') are configured as a mutual layer structure (hereinafter called 'touch screen'), the display 551 is usable as an input device as well as an output device. In this case, the touch sensor can be configured as a touch film, a touch sheet, or a touchpad.

The touch sensor can be configured to convert pressure applied to a specific portion of the display 451 or a variation of capacitance generated from a specific portion of the display 451 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 480. Therefore, the controller 480 is made aware when a prescribed portion of the display 451 is touched.

Referring to FIG. 4, a proximity sensor 441 can be provided at an internal area of the mobile terminal 400 enclosed by the touch screen or around the touch screen. The proximity sensor 441 is a sensor that detects a presence or non-presence of an object approaching a prescribed detecting surface or an object existing (or located) around the proximity sensor 441 using an electromagnetic field strength or infrared ray without mechanical contact. Hence, the proximity sensor 441 is more durable than a contact type sensor and also has utility broader than the contact type sensor.

The proximity sensor 441 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or is stored in the memory 460. During operation, the audio output module 452 outputs audio relating to a particular function (e.g., call received, message received). The audio output module 452 may be implemented using one or more speakers, buzzers, other audio producing devices, and combinations of these devices.

The alarm unit 453 outputs a signal for announcing the occurrence of a particular event associated with the mobile terminal 400. Typical events include a call received, a message received and a touch input received. The alarm unit 453 can output a signal for announcing the event occurrence by way of vibration as well as video or audio signal. The video or audio signal can be output via the display 451 or the audio output module 452. Hence, the display 451 or the audio output module 452 can be regarded as a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output by being synthesized (or composited) together or can be output in sequence. The haptic module 454 can generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, at least two haptic modules 454 can be provided in the mobile terminal 400 in accordance with an embodiment of the mobile terminal 400.

The memory 460 is generally used to store various types of data to support the processing, control, and storage requirements of the mobile terminal 400. Examples of such data include program instructions for applications operating on the mobile terminal 400, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 460. Moreover, data for various patterns of vibration and/or sound output in response to a touch input to the touch screen can be stored in the memory 460.

The memory 460 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 400 can operate in association with a web storage for performing a storage function of the memory 560 on the Internet.

The interface unit 470 may be implemented to couple the mobile terminal 400 with external devices. The interface unit 470 receives data from the external devices or is supplied with power and then transfers the data or power to the respective elements of the mobile terminal 400 or enables data within the mobile terminal 400 to be transferred to the external devices. The interface unit 470 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 400 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 500 via the corresponding port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals input from the cradle or the power can operate as a signal enabling the mobile terminal 400 to recognize that it is correctly loaded in the cradle.

The controller 480 typically controls the overall operations of the mobile terminal 400. For example, the controller 480 performs the control and processing associated with voice calls, data communications, and video calls. The controller 480 may include a multimedia module 481 that provides multimedia playback. The multimedia module 481 may be configured as part of the controller 480, or implemented as a separate component. Moreover, the controller 480 can perform a pattern (or image) recognizing process for recognizing a writing input and a picture drawing input performed on the touch screen as characters or images, respectively.

The power supply unit 490 provides power required by various components of the mobile terminal 400. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 480.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

FIG. 5 illustrates a perspective view illustrating one example of a watch-type mobile terminal 300 according to an embodiment of the present disclosure. As illustrated in FIG. 5, the watch-type mobile terminal 500 includes a main body 501 with a display unit 551 and a band 502 connected to the main body 501 to be wearable on a wrist. In general, mobile terminal 500 may be configured to include features that are the same or similar to that of mobile terminal 400 of FIG. 4.

The main body 501 may include a case having a certain appearance. As illustrated, the case may include a first case 501*a* and a second case 501*b* cooperatively defining an inner space for accommodating various electronic components. Other configurations are possible. For instance, a single case may alternatively be implemented, with such a case being configured to define the inner space, thereby implementing a mobile terminal 400 with a uni-body.

The watch-type mobile terminal 500 can perform wireless communication, and an antenna for the wireless communication can be installed in the main body 501. The antenna may extend its function using the case. For example, a case including a conductive material may be electrically connected to the antenna to extend a ground area or a radiation area.

The display unit 551 is shown located at the front side of the main body 501 so that displayed information is viewable to a user. In some embodiments, the display unit 551 includes a touch sensor so that the display unit can function as a touch screen. As illustrated, window 551*a* is positioned on the first case 501*a* to form a front surface of the terminal body together with the first case 501*a*.

The illustrated embodiment includes audio output module 552, a camera 521, a microphone 522, and a user input unit 523 positioned on the main body 501. When the display unit 551 is implemented as a touch screen, additional function keys may be minimized or eliminated. For example, when the touch screen is implemented, the user input unit 523 may be omitted.

The band 502 is commonly worn on the user's wrist and may be made of a flexible material for facilitating wearing of the device. As one example, the band 502 may be made of fur, rubber, silicon, synthetic resin, or the like. The band 502 may also be configured to be detachable from the main body 501. Accordingly, the band 202 may be replaceable with various types of bands according to a user's preference.

In one configuration, the band 502 may be used for extending the performance of the antenna. For example, the band may include therein a ground extending portion (not shown) electrically connected to the antenna to extend a ground area.

The band 502 may include fastener 502*a*. The fastener 502*a* may be implemented into a buckle type, a snap-fit hook structure, a Velcro® type, or the like, and include a flexible section or material. The drawing illustrates an example that the fastener 502*a* is implemented using a buckle.

Figure 6:
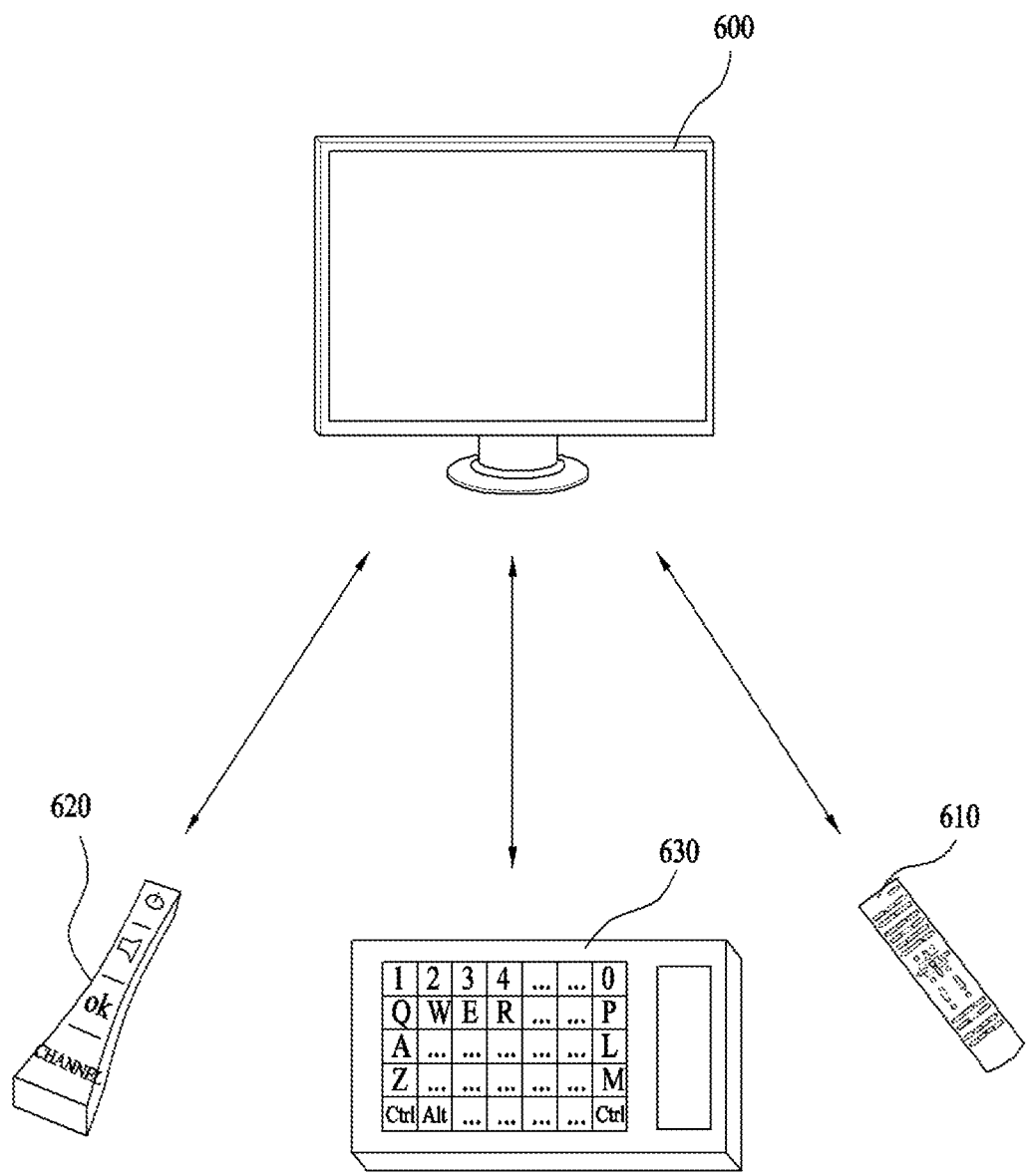
FIG. 6 illustrates a diagram for a controller for control of a digital device according to an embodiment of the present invention.

FIG. 6 illustrates a diagram illustrating a controlling means of a digital device according to one embodiment of the present disclosure.

To execute various operations for implementing the present disclosure according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad. The keyboard 630 have been implemented so that it is similar to a keyboard of a PC in order to conveniently input text because the traditional remote control 610 is not sufficient enough to control the digital device 600 since the digital device 600 offers more than just providing broadcast programs as it did before, but has advanced into an intelligent integrated digital device providing web browser, application, social network service (SNS) and the like.

Meanwhile, the control means such as the remote control 610, the pointing device 620, and the keyboard 630 can, if necessary, include a touchpad to control functions of text input, move the pointer, enlarging/reducing pictures and video clips more conveniently.

Hereinafter, a method of processing data in a digital device will be described in more detail according to various embodiment(s) of the present invention with reference to the accompanying drawings.

In the specification, according to the present invention, in particular, a method of using an input interface of a second digital device instead of a keyboard of a first digital device and processing data input through the input interface when the first digital device needs to provide the keyboard on a screen during an execution procedure will be described with regard to various embodiments of the present invention.

Here, the first digital device may be, for example, a DTV and the second digital device may be, for example, a mobile terminal. The mobile terminal may include a smartphone, a wearable device, and so on. Accordingly, a keyboard, voice, gesture, or combinations thereof of the smartphone or voice, gesture, or combinations thereof of the wearable device may replace a function of a keyboard of the DTV. However, the present invention may not be limited thereto and may be applied to any case in which a physical keyboard or a virtual keyboard is used.

A method of processing data of a digital device according to an embodiment of the present invention may include executing an application, receiving a keyboard provision request signal, being paired with an external device with higher priority for providing a keyboard, transmitting a first control command for requesting keyboard input data to the external device, receiving and outputting the keyboard input data generated by the external device, performing an operation according to the output keyboard input data, and terminating keyboard input.

The method may further include receiving state data of the external device from the external device and transmitting a second control command for keyboard provision control of the external device based on the state data of the received external device.

In the above case, the state data of the external device from the external device may include at least one of identification data for identifying whether a current state of the external device is a sleep state, identification data for identifying whether the external device currently executes an application, and identification data for identifying whether an executed application is a foreground application or a background application.

The method may further include outputting a list of paired external devices, reading data with keyboard provision priority, identifying an external device with higher keyboard provision priority than the digital device from the external device list based on the read data with keyboard provision priority, and determining whether the identified external device is within a range predetermined by the digital device. When the external device is not within the predetermined range, at least one of repetition of a pairing operation a predetermined number of times until an external device with higher keyboard provision priority within the predetermined range than the digital device is identified and an operation of transmitting data about an application currently executed in the digital device in the first command to the identified external device may be performed.

The method may further include identifying a user and determining a keyboard provision authority of the identified user. The determining of the keyboard provision authority of the identified user may further include determining a use authority of the identified user based on time information and attributes of a currently executed application, and as the determination result, when the use authority does not correspond to preset authority data, a use authority check request signal of the identified user may be transmitted to a pre-stored external device.

The method may further include identifying attributes of the currently executed application, determining whether a single keyboard or a multiple keyboard needs to be provided according to the identified attributes of the application, and transmitting the first control command to one or more external devices according to the determination result.

In the above case, when a predetermined application is being executed and a keyboard for the predetermined application is being provided during reception of the first control command, the external device may provide a user interface (UI) according to reception of the first control command, provide an input stack bar according to user selection via the provided UI, provide a conversion icon for conversion between the pre-provided keyboard and a keyboard for the digital device, change a window for the application according to selection of the conversion icon, and output data of an application being executed by the digital device. The digital device may be a DTV and the external device may be a mobile terminal.

Figure 7:
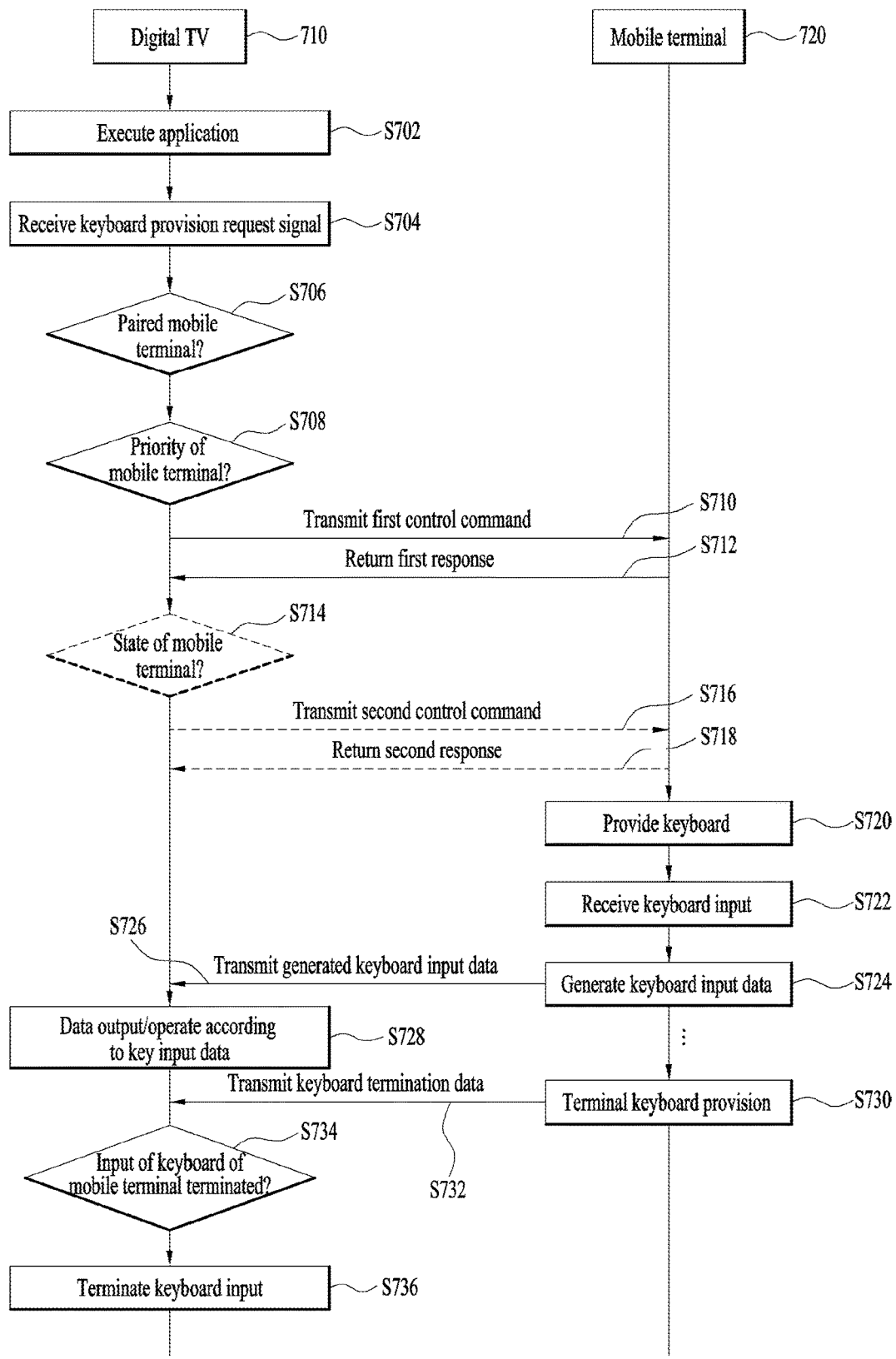
FIG. 7 illustrates a flowchart for explanation of a procedure of processing data in a digital TV according to an embodiment of the present invention.

FIG. 7 is a flowchart for explanation of a method of processing data in a DTV 710 according to an embodiment of the present invention.

The DTV 710 may provide an application on a screen (S702). The DTV 710 may receive a keyboard provision request signal during provision of the application (S704).

Upon receiving the keyboard provision request signal, the DTV 710 may determine whether there is a paired mobile terminal 720 (S706).

As the determination result of operation S706, when there is a paired mobile terminal 720, the DTV 710 may determine whether priority of the paired mobile terminal 720 is higher than priority of the DTV 710 with respect to the keyboard provision request signal (S708).

As the determination result of operation S708, when the priority of the paired mobile terminal 720 is higher than the priority of the DTV 710, the DTV 710 may transmit a first control command associated with a keyboard to the mobile terminal 720 (S710). Here, the first control command may include at least one of a keyboard provision request on the mobile terminal 720, a transmission request of keyboard input data according to user input through a keyboard provided on the mobile terminal 720, and a transmission request for keyboard termination data according to termination of the user input through the keyboard provided on the mobile terminal 720. Here, a request that is not included in the first control command may be re-transmitted to the mobile terminal 720 from the DTV 710 at a corresponding time point. Upon receiving the first control command, the mobile terminal 720 may return a first response corresponding to the first control command to the DTV 710 (S712).

After or simultaneously with returning the first response, the mobile terminal 720 may provide a keyboard on a screen of the mobile terminal 720 (S720).

Here, prior to operation S720, the DTV 710 may determine a state of the mobile terminal 720 based on the returned first response from the mobile terminal 720 (S714) and re-transmit a second control command to the mobile terminal 720 based on the determination result of operation S714 (S716). The mobile terminal 720 may return a second response to the second control command (S718). At least one of operations S714 to S718 may be skipped according to a system or a situation. A description thereof will be given below and a detailed description thereof is not given here.

The mobile terminal 720 may provide a keyboard on the screen in operation S720 and then receive keyboard input of the user (S722), and generate keyboard input data based on the received keyboard input (S724). The mobile terminal 720 may transmit the generated keyboard input data to the DTV 710 (S726).

The DTV 710 may output text data, etc. on the screen of the DTV 710 based on the keyboard input data received from the mobile terminal 720 and may be operated based on the text data, etc. (S728).

Operations S722 to S728 may be repeatedly performed before keyboard provision of the mobile terminal 720 is terminated (S730). The mobile terminal 720 may remove the keyboard that is being provided on the screen according to a request signal for terminating keyboard provision (S730) and transmit keyboard termination data to the DTV 710 simultaneously with removal of the keyboard (S732).

Upon determining that keyboard input of a mobile terminal is terminated according to reception of the keyboard termination data of the mobile terminal 720 (S734), the DTV 710 may terminate an entire procedure of the keyboard input according to the keyboard provision request signal of operation S704 in the DTV 710 (S734).

In the above case, the request signal for terminating keyboard provision is not necessarily performed according to button input of a keyboard provision termination key and may be performed in any one of the case in which a predetermined application is executed and there is no user input for a predetermined time period in the mobile terminal 720, the case in which the user pushes a power key button of the mobile terminal 720, and the case in which power of the mobile terminal 720 is turned off according to an event.

Although not illustrated, when the DTV 710 determines that keyboard input is not necessary any longer similarly to, for example, operation S734, operations S730 to S732 may be performed according to a control command for requesting termination of a keyboard provided on the mobile terminal 720.

Figure 8:
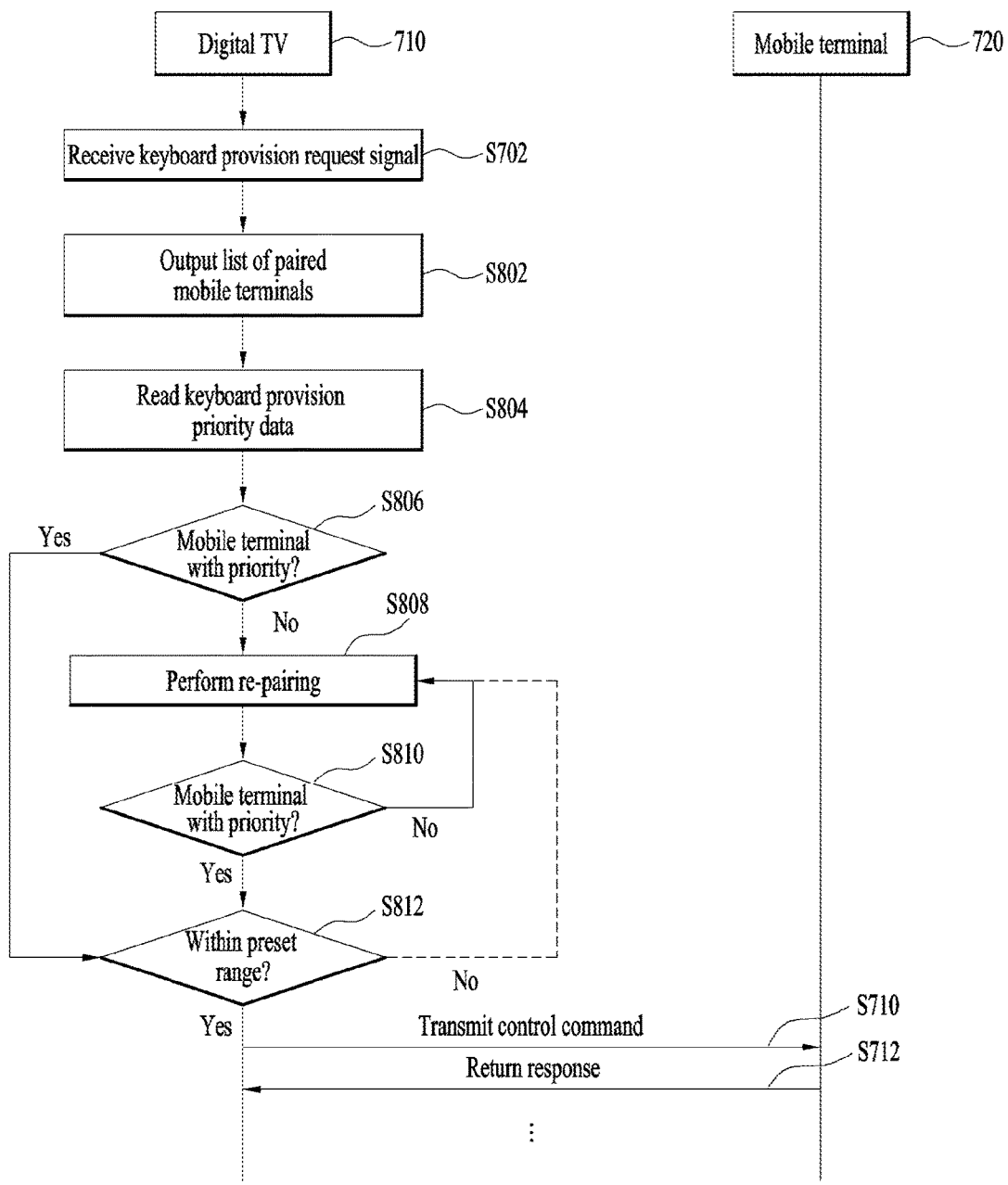
FIG. 8 illustrates a flowchart for explanation of a procedure of transmitting a control command to a mobile terminal from a digital TV according to an embodiment of the present invention.

FIG. 8 is a flowchart for explanation of a procedure of transmitting a control command to a mobile terminal from a DTV according to an embodiment of the present invention.

In particular, FIG. 8 illustrates detailed operations between operations S702 and S710 of FIG. 7. In other words, FIG. 8 illustrates detailed operations when there are one or more mobile terminals with higher priority for providing a keyboard according to a request than the DTV 710.

As described above, upon receiving the keyboard provision request signal (S702), the DTV 710 may output a list of paired external devices on a screen (S802). Here, the DTV 710 may read pre-stored keyboard provision priority data from a memory (S804) and determine whether there is a mobile with higher priority for providing a keyboard than the DTV 710 in the output list (S806).

As the determination result of operation S806, when there is no mobile terminal with higher priority for providing a keyboard than the DTV 710, the DTV 710 may re-perform pairing (re-pairing) (S808). However, in this case, the DTV 710 may provide a keyboard of a DTV instead of performing the re-pairing.

The DTV 710 may re-determine whether there is no mobile terminal with higher keyboard priority than the DTV 710 from a list of mobile terminals paired as the result of re-pairing like in operation S806 (S810).

As the result of determination of operation S806 or S810, when there is a mobile terminal with higher priority for providing a keyboard than the DTV 710, the DTV 710 may determine whether the mobile terminal 720 is positioned within a range predetermined based on a position of the DTV 710 (S812).

As the result of determination of operation S812, when the mobile terminal is positioned within the predetermined range, the DTV 710 may transmit a control command to the mobile terminal 720 (S710).

As the result of determination of operation S812, when the mobile terminal is not positioned within the predetermined range, the DTV 710 may perform the following operations. First, the DTV 710 may repeatedly perform operations S808 to S812 until there is a mobile terminal with higher priority for providing a keyboard than the DTV 710 within the predetermined range. In this case, the repetition may be performed, for example, at least predetermined number of times, and when the above condition is not still satisfied as the repetition result, an operation of providing a keyboard of the DTV 710 may be performed. Second, as the result of determination of operation S810, when there is no mobile terminal with higher priority for providing a keyboard than the DTV 710 within the predetermined range, the DTV 710 may provide guide data about a current situation so as to allow a mobile terminal or a mobile terminal user to recognize the situation and make a request for a response to whether a keyboard is output. The guide data may include all data items that allow a mobile terminal or a mobile terminal user to determine whether a keyboard is provided on a screen of the mobile terminal, such as an image formed by capturing a current image of a DTV as well as text data about the situation. The DTV may transmit image data according to keyboard input data of a mobile terminal using a data sharing method such as mirroring and Miracast so as to provide convenient keyboard input through the mobile terminal.

Figure 9:
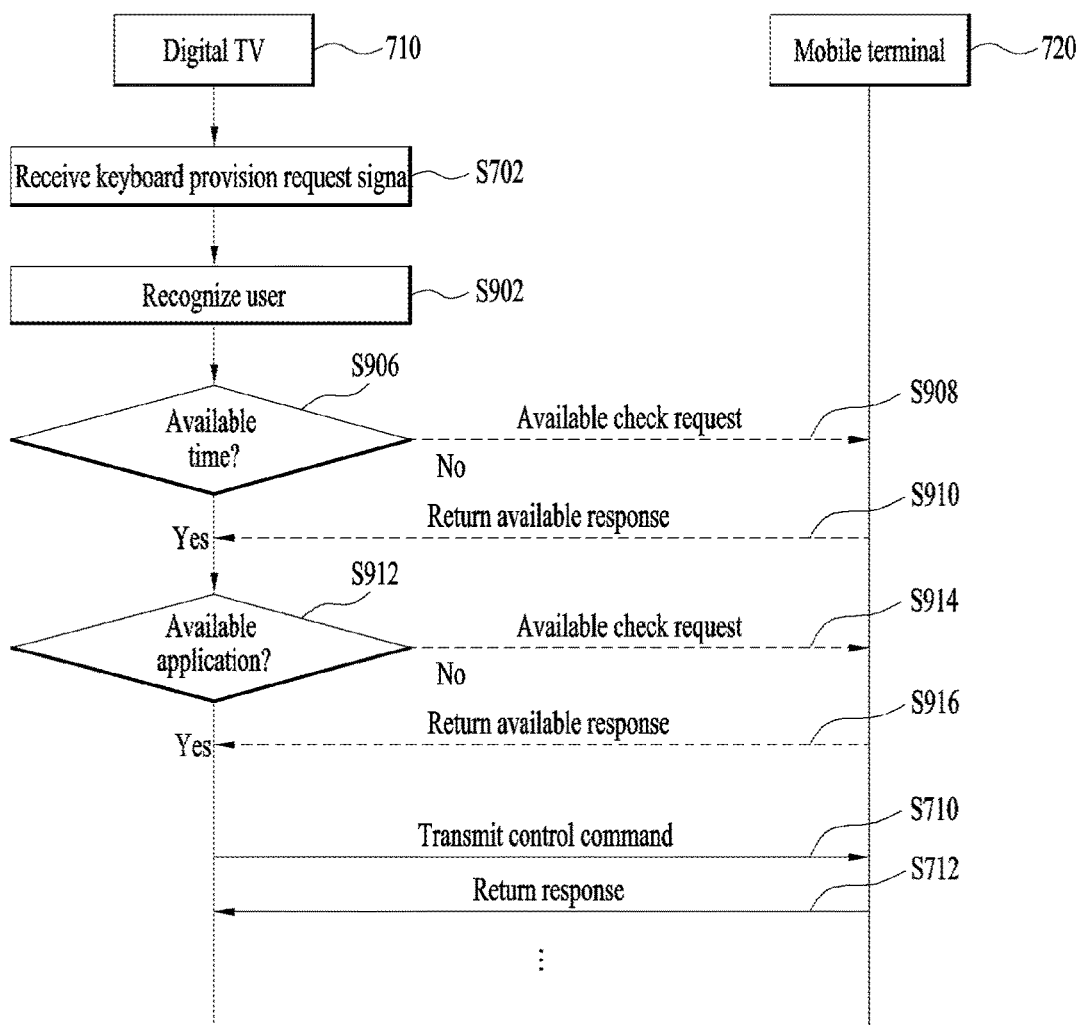
FIG. 9 illustrates a flowchart for explanation of a procedure of transmitting a control command to a mobile terminal from a digital TV according to another embodiment of the present invention.

FIG. 9 is a flowchart for explanation of a procedure of transmitting a control command to a mobile terminal from a DTV according to another embodiment of the present invention.

FIG. 9 also illustrates detailed operations between operation S702, i.e., keyboard provision request signal and operation S710, i.e., control command transmission operation similarly to the above FIG. 8.

Referring to FIG. 9, upon receiving the keyboard provision request signal (S702), the DTV 710 may recognize a user who views the DTV 710 (S902). In this case, the user may include a user who transmits the keyboard provision request signal but is not limited thereto. The recognition procedure may be performed using an image, a gesture, etc. acquired through a camera sensor included in the DTV 710 or an external device, a voice acquired through a microphone included in the DTV 710, an external device, a remote controller, or the like, a fingerprint acquired through a fingerprint sensor included in the DTV 710, the external device, a remote controller, or the like, pupil recognition of a user, a chip implanted into the body, or a combination of two or more thereof.

The DTV 710 may determine whether the user recognized in operation S902 is a user that can use a DTV.

Whether the user can use the DTV may be determined using the following detailed operations.

First, the DTV 710 may determine whether current time is time that the recognized user can use the DTV 710 (S906), and as the determination result, when the current time is not time that the recognized user can use the DTV 710, the DTV 710 may transmit an available check request to the mobile terminal 720 (S908) and the mobile terminal 720 may return a response to the request of operation S908 (S910).

Upon determining that current time is time that the recognized user can use the DTV 710, the DTV 710 may determine whether an application being currently executed in the DTV 710 is available by the user (S912). Upon determining that the application is not an application available by the recognized user as the determination result, the DTV 710 may transmit an available check request to the mobile terminal 720 (S914) and the mobile terminal 720 may return a response to the request to operation S914 (S916). Upon lastly determining that the user recognized by the DTV 710 is a user who can use the DTV 710 through the aforementioned S902 to S912, the DTV 710 may transmit a control command to the mobile terminal 720 (S710), as described above.

In the above case, whether the user can use the DTV may be determined with reference to, for example, preset setting data. Although FIG. 9 illustrates the case in which the DTV 710 determines whether the user can use the DTV, upon receiving the keyboard provision request signal and recognizing a user, the DTV 710 may transmit data thereof to the mobile terminal 720, allow the mobile terminal 720 to determine whether the user can use the DTV and may be operated according to a control command based on the determination result.

For example, when the recognized user is a child in the above FIG. 9, the mobile terminal 720 may be a mobile terminal of a parent as an entity for determination of whether the user can use the DTV.

In addition, the DTV 710 may also provide guide data according to the determination result on a screen so as to allow the recognized user to recognize the guide data during the aforementioned determination procedure.

Upon determining that the recognized user cannot currently use the DTV 710 according to the preset setting, the DTV 710 may provide a user interface to a user of the mobile terminal 720 having authority so as to allow the recognized user to request the user of the mobile terminal 720 to check whether the recognized user can use the DTV 710, and upon receiving a command for change of available setting from the user of the mobile terminal 720, the DTV 710 may provide a user interface so as to change, for example, available time and available application according to the command and, thus, the mobile terminal 720 may directly change the settings of the DTV 710. As described above, when it is determined that the user recognized by the DTV 710 can use the DTV 710, for example, when the recognized user is a user that experiences the aforementioned checking request, for example, a minor who has obtained parental permission, keyboard input after operation S710 may be processed to be continuously permitted by the parent. That is, the control command of operation S710 may be transmitted to the mobile terminal 720 of the parent instead of a device desired by the recognized user.

In relation to whether the recognized user can use the DTV 710, although FIG. 9 illustrates and describes the case in which whether the recognized user can use the DTV 710 is determined using two points including available time and an available application, the present invention is not limited thereto and, thus, only one of the two points may be used and an order of the two points may be reversed. It would be obvious that other methods other than the aforementioned two points are used.

Figure 10:
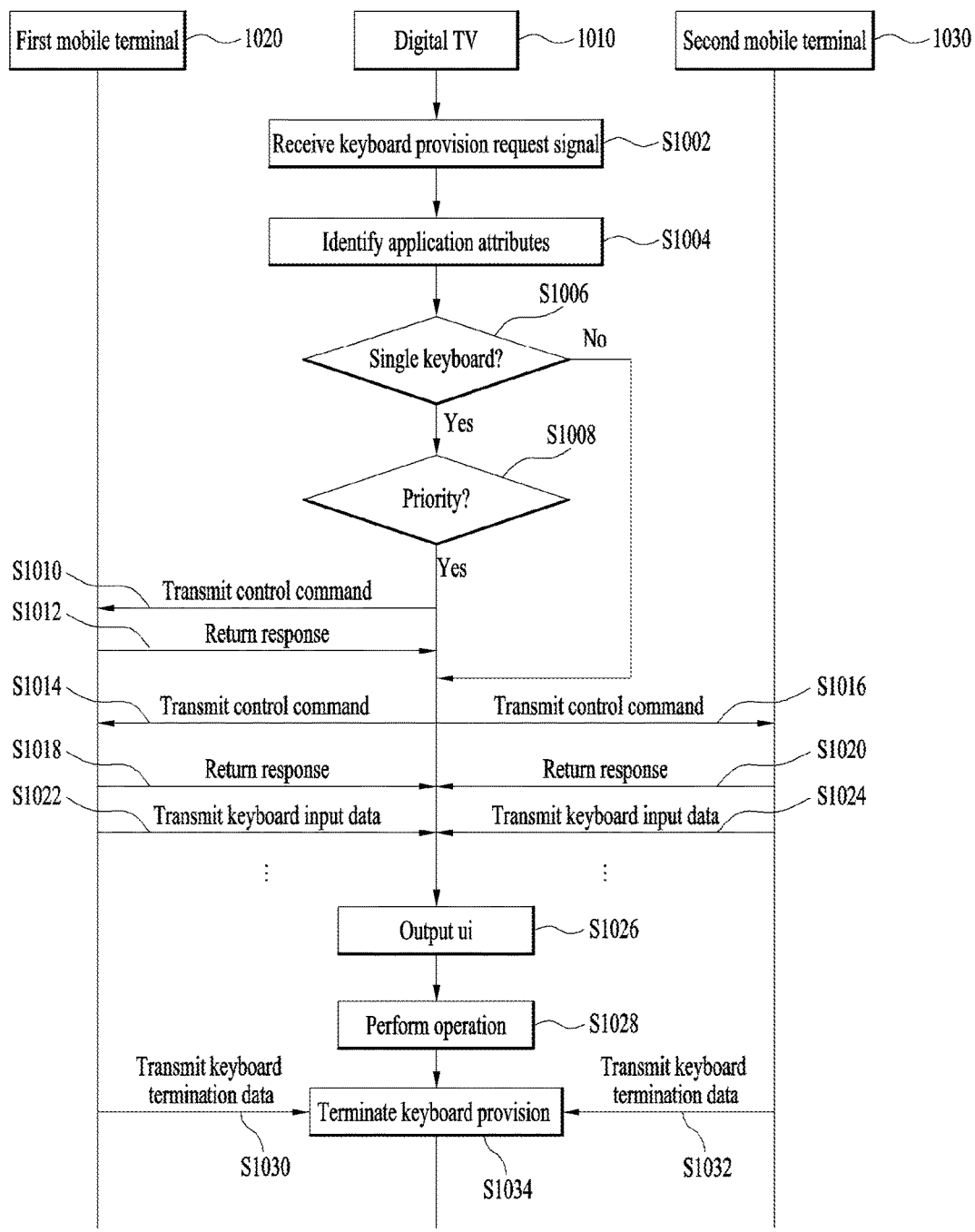
FIG. 10 illustrates a flowchart for explanation of a procedure of transmitting a control command to a mobile terminal from a digital TV based on application attributes according to an embodiment of the present invention.

FIG. 10 is a flowchart for explanation of a procedure of transmitting a control command to a mobile terminal from a DTV based on application attributes according to an embodiment of the present invention.

FIG. 10 is a diagram illustrating a processing procedure according to attributes of an application being currently executed in a DTV 1010, i.e., attributes of an application related to a keyboard provision request upon receiving the keyboard provision request signal from the DTV 1010 (S1002).

In FIG. 10, one DTV 1010 may receive keyboard input data from keyboards of a plurality of mobile terminals (e.g., a first mobile terminal 1020, a second mobile terminal 1030, etc.) and process the keyboard input data according to the application attributes.

Upon executing an application and then receiving a keyboard provision request signal (S1002), the DTV 1010 may first determine the application attributes in order to provide a keyboard in response to the request. To this end, the DTV 1010 may read or read and parse application attributes data from a memory or the like and identify attributes if a currently executed application (S1004). In this specification, the application attributes may include, for example, a kind and type of an application such as a game, a web browser, a video on demand (VOD), and banking and refer to data about a reference for determination of a single keyboard or a multiple keyboard.

As the identification result of operation S1004, the DTV 1010 may determine whether the application attributes correspond to the single keyboard, that is, whether the single keyboard is sufficient (S1006). As the determination result of operation S1006, when the single keyboard is sufficient based on the application attributes, the DTV 1010 may determine whether there is a mobile terminal with higher priority than a DTV based on keyboard priority data in relation to a corresponding device or a corresponding application (S1008). The DTV 1010 may transmit a control command to the first mobile terminal 1020 with higher keyboard priority than the DTV 1010 (S1010) and make a request for pairing based on the determination results of operations S1006 and S1008. The DTV 1010 may receive a return of a response to the control command from the first mobile terminal 1020 (S1012) and according to the returned response, that is, upon being paired with the first mobile terminal 1020, the DTV 1010 may transmit a control command for requesting keyboard provision on a screen of the first mobile terminal 1020 (S1014). The DTV 1010 may receive a return of a response corresponding to the control command transmitted from the first mobile terminal 1020 (S1018).

On the other hand, as the determination result of operation S1006, upon determining that a multiple keyboard is required based on the application attributes, the DTV 1010 may transmit a second control command for pairing to each of a plurality of mobile terminals with higher keyboard priority than the DTV 1010, that is, the first mobile terminal 1020 and the second mobile terminal 1030 (S1014 and S1016). The above command transmission in operation S1014 and the control command here are different in terms of functions thereof according to the determination result of operation S1006. The DTV 1010 may receive responses returned in response to the control commands that are transmitted to the first mobile terminal 1020 and the second mobile terminal 1030, respectively (S1018 and S1020).

Through the aforementioned procedure, the DTV 1010 may be paired with the first mobile terminal 1020 or the first mobile terminal 1020 and the second mobile terminal 1030 and may receive keyboard input data generated in response to keyboard input of a user after a corresponding mobile terminal provides a keyboard according to a pre-transmitted control command (S1022 and S1024).

Here, upon receiving the keyboard input data from at least one of the first mobile terminal 1020 and the second mobile terminal 1030, the DTV 1010 may output a required UI based on the keyboard input data on a screen of the DTV 1010 and perform an operation according to user selection on the output UI (S1028).

This procedure may be repeatedly performed before keyboard provision termination (S1034), which will be described below. In other words, when keyboard termination data is transmitted from at least one of the first mobile terminal 1020 and the second mobile terminal 1030 (S1030 and S1032), the DTV 1010 may terminate the keyboard provision procedure (S1034).

In relation to operation S1034, there is no problem when the DTV 1010 communicates with a single keyboard through one mobile terminal based on application attributes, but when the DTV 1010 communicates with a multiple keyboard through a plurality of mobile terminals, whole keyboard provision may be terminated when keyboard provision termination data is received from a mobile terminal that provides one keyboard input data item or whole keyboard provision may be terminated only when the keyboard provision termination data is received from all mobile terminals. Upon determining that the whole keyboard provision termination, the DTV 1010 may transmit a request for keyboard provision termination or a command for rejection of reception of more keyboard input data to mobile terminal(s) that have provided the keyboard input data.

Operations S1030 and S1032 may correspond to a procedure of a response to a control command when the DTV 1010 determines that the keyboard input data is not required any longer and then transmits the control command about the keyboard input data, that is, a procedure of response indicating that keyboard provision is to be terminated. During an operation according to a multiple keyboard input through a plurality of mobile terminals, when the DTV 1010 receives a keyboard termination signal from one or more mobile terminals or connection such as pairing is released, the DTV 1010 may make a re-request for connection with a corresponding mobile terminal and re-transmit a control command for keyboard provision. When a disconnected mobile terminal functions as a main device that performs a main function in relation to an operation of a multiple keyboard, a check request for keyboard provision termination may be transmitted to the mobile terminal and the whole multiple keyboard provision procedure may be terminated in response to a response to the corresponding terminal.

In FIG. 10 and the above description thereof, the cases corresponding to a single keyboard and a multiple keyboard are first differentiated, but the case corresponding to the single keyboard may be changed to the case corresponding to the multiple keyboard according to a request or the like during the corresponding procedure, or vice versa. In the above case, in the case of the single keyboard, operations S1014 to S1020 may not be performed and may be bypassed and, on the other hand, in the case of the multiple keyboard, operations S1010 to S1012 may not be performed and may be bypassed. In the latter case corresponding to the multiple keyboard, whether operation S1008 takes priority. Although not illustrated, in the former case corresponding to the single keyboard, priority may be determined, and when priority for providing a keyboard of a mobile terminal is lower than priority of the DTV 1010, a keyboard of a DTV may be immediately provided.

Figure 11:
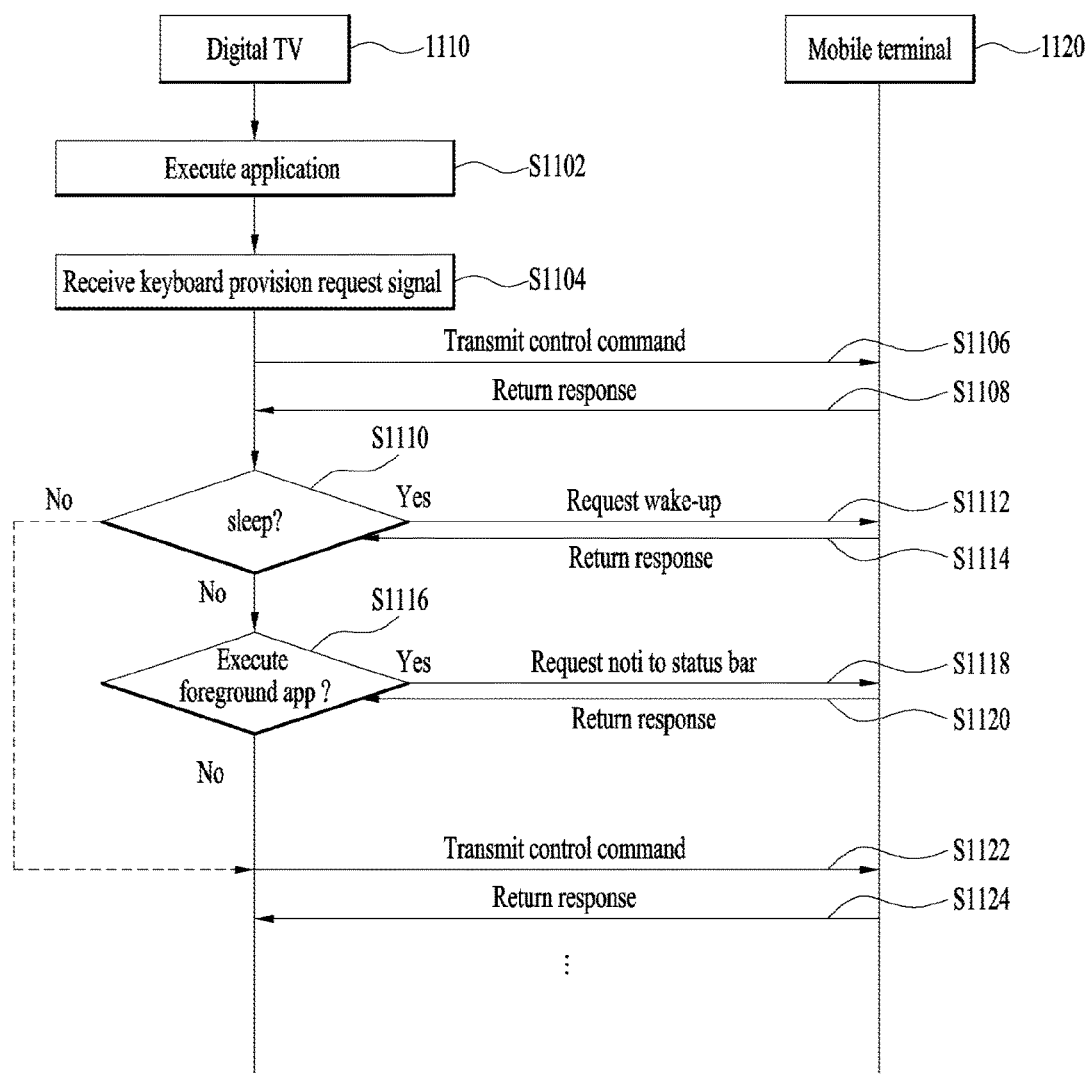
FIG. 11 illustrates a flowchart for explanation of a procedure of transmitting a control command from a digital TV based on a state of a mobile terminal according to an embodiment of the present invention.

FIG. 11 is a flowchart for explanation of a procedure of transmitting a control command from a DTV based on a state of a mobile terminal according to an embodiment of the present invention.

FIG. 11 is a diagram illustrating a processing procedure according to a state of a mobile terminal 1120, in particular, when a DTV 1110 transmits a control command related to keyboard provision and so on to a mobile terminal 1120 with high keyboard priority.

Upon executing an application (S1102) and receiving a keyboard provision request signal (S1104), the DTV 1110 may provide a keyboard to the mobile terminal 1120 with high keyboard priority and transmit a control command including a transmission request of keyboard input data through the provided keyboard (S1106) and receive a return of a response signal to the control command from the mobile terminal 1120 (S1108).

The DTV 1110 may parse the returned response signal and determine a state of the mobile terminal 1120. For example, the DTV 1110 may first determine whether the mobile terminal 1120 is in a sleep state based on the parsed response signal (S1110). When the mobile terminal 1120 is in a sleep state as the determination result, the DTV 1110 may transmit a wake-up request for keyboard provision (S1112) and receive a return of a response to the wake-up request (S1114). Upon receiving the wake-up request, the mobile terminal 1120 may provide a UI related to the reason for wake-up of a mobile terminal to a user in advance and notify the user of a state of the mobile terminal that is suddenly activated in order to wake up the mobile terminal. In the above case, the sleep state may also include a screen lock state of the mobile terminal 1120. However, a screen of the mobile terminal 1120 is in a lock state, the state of the mobile terminal 1120 may not be determined as a sleep state simply by providing a keyboard. In this case, despite a screen lock state, the state of the mobile terminal 1120 is not affected by simply keyboard provision and keyboard input therethrough and, thus, a control command may be transmitted so as to transmit keyboard input data without screen lock release.

When the mobile terminal 1120 is not in a sleep state or the sleep state is released, the DTV 1110 may determine whether there is a currently executed application. When there is a currently executed application in the mobile terminal 1120, the DTV 1110 may determine whether the executed application is a foreground application or a background application (S1116). As the determination result of operation S1116, when the application being executed in the mobile terminal 1120 is a foreground application, the DTV 1110 may transmit a control command for requesting notification of a message of a keyboard provision request in the form of a state bar or a notification message to the mobile terminal 1120 (S1118) and receive a return of a response to the control command (S1120).

Through the above procedure, when the mobile terminal 1120 is finally in a state in which a keyboard can be provided, the DTV 1110 may transmit a control command (S1122) to make a request for keyboard input data and receive keyboard input data from the mobile terminal 1120 (S1124). Then, as described above, this operation may be repeatedly performed before keyboard provision termination and keyboard provision may be terminated according to the keyboard provision termination request.

In the above case, the DTV 1110 may determine priority of an application that is currently executed in the mobile terminal 1120 based on an application being provided in the DTV 1110 in consideration of application attributes irrespective of whether the currently executed application is a foreground application or a background application. As the determination result, upon determining that priority of an application being provided in the DTV 1110 is higher than that of an application being provided in the mobile terminal 1120, the DTV 1110 may transmit, to the mobile terminal 1120, a control command of requesting conversion of an executed foreground application into a background application, requesting application termination of an executed background application, or requesting preferential keyboard provision. The DTV 1110 may determine whether an application that is currently executed in the mobile terminal 1120 can be associated with an application that is being executed in the DTV 1110. Here, the association may refer to conversion between applications, attributes, kinds, or types of which are similar. The DTV 1110 may transmit the control command to the mobile terminal 1120 and when the same or similar application to an application that is currently executed in a DTV and makes a request for keyboard provision is present in the mobile terminal 1120, the DTV 1110 may control the corresponding application to automatically and directly input keyboard input data through at least one of download, install, and execution without user selection.

Figure 13:
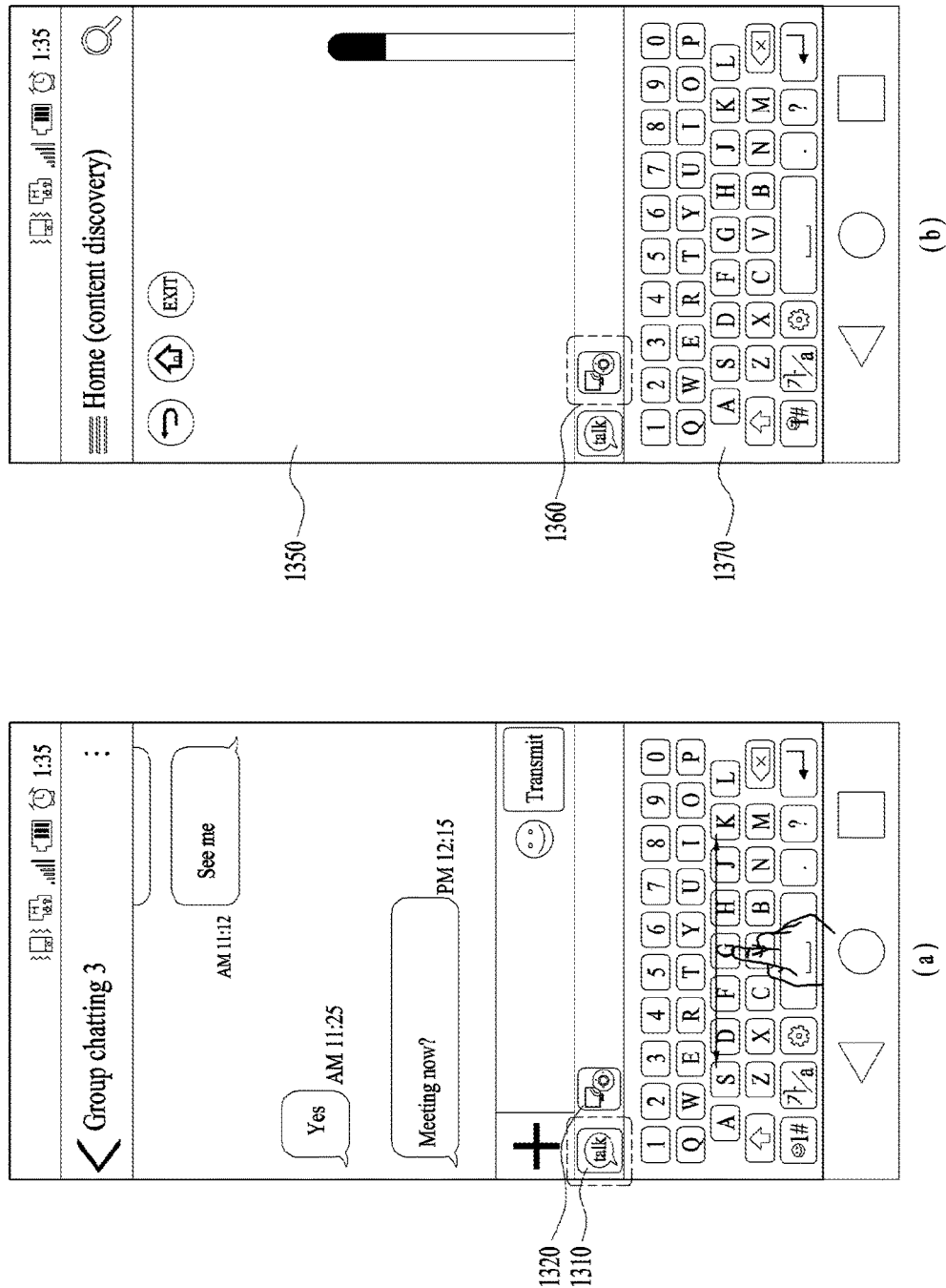
Figure 14:
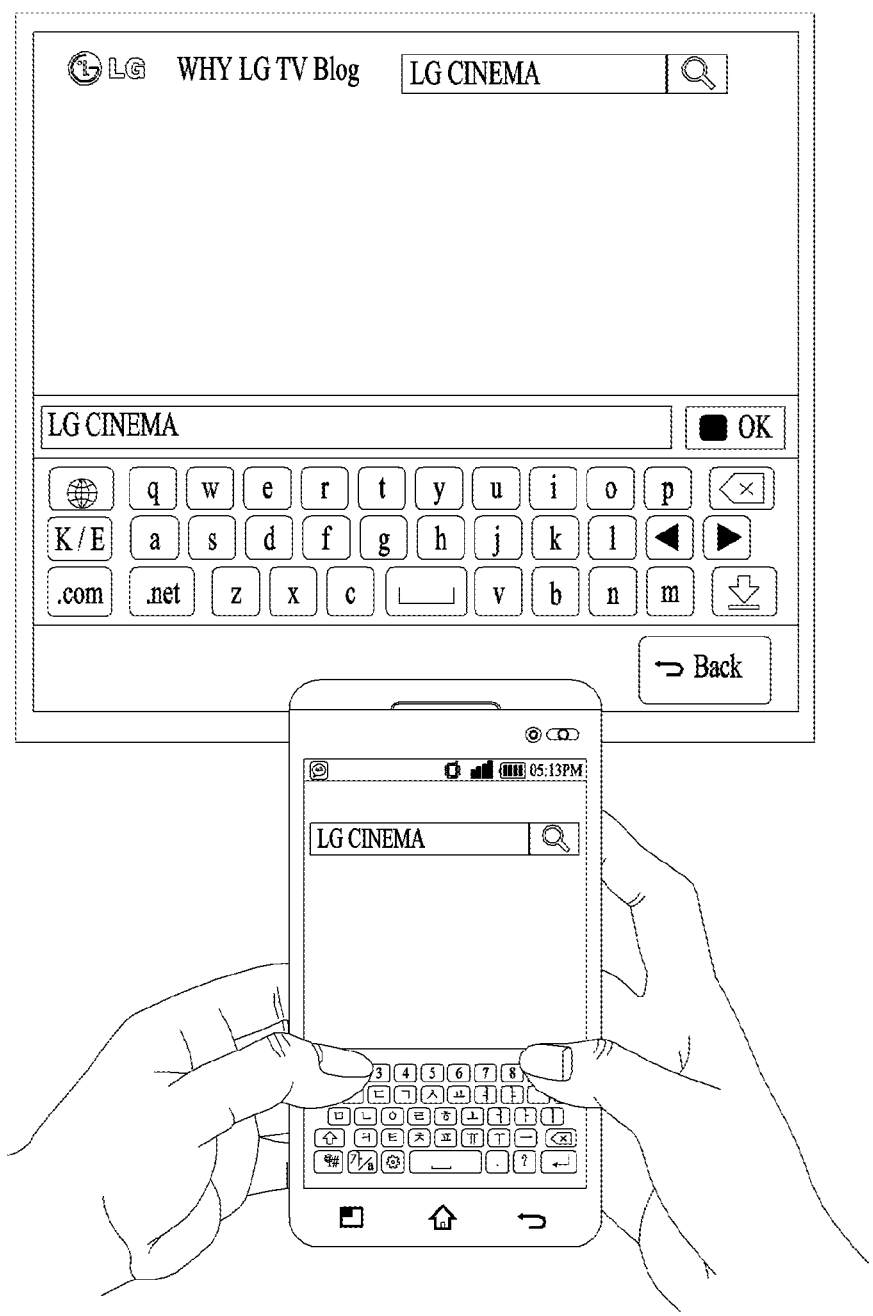

FIGS. 12 to 14 are diagrams illustrating a method of providing a keyboard according to a request of a DTV by a mobile terminal according to embodiments of the present invention.

FIG. 12 illustrates an embodiment of a method of adding input stack to an application when keyboard input event is received from a DTV during execution of an application in a mobile terminal. In this case, when a keyboard is pre-provided in relation to the application being executed in the mobile terminal, as described above, input stack may be added to the provided keyboard so as to handle the keyboard input event of the DTV while minimizing inconvenience of image conversion or use of a mobile terminal.

Referring to FIG. 12(*a*), the mobile terminal currently executes a messenger application and pre-provides a keyboard 1210 along with execution of the message application. Here, according to the present invention, upon receiving keyboard input providing request to the mobile terminal from the DTV, the mobile terminal may provide a UI 1230 indicating the keyboard input providing request to a UI 1230 from the DTV in a chat window 1220. In this case, when keyboard input providing request of the DTV is accepted through the UI 1230, processing illustrated in FIG. 12(*b*) may be performed.

Referring to FIG. 12(*b*), the mobile terminal may provide a UI 1250 about acceptance of the keyboard input providing request of the DTV according to acceptance of the keyboard input providing request of the DTV and provide an icon 1262 for keyboard input of a corresponding application and an icon 1264 for keyboard input of the DTV on the input stack bar 1260. In other words, the mobile terminal may select any one of icons provided on the input stack bar 1260 so as to provide a keyboard corresponding to the selection.

Although the input stack bar 1260 is used for keyboard input conversion according to the present invention, an icon of another favorite application or an icon for conversion into a favorite chat window or a currently activated chat window in a corresponding application may be provided together on the input stack bar 1260 so as to perform conversion of an image or an application according to selection without a separate input. In the case, during conversion into another chat window, for example, during chat with a first user, when there is a chat request from a second user, a chat window execution icon for chat with the second user may be provided on the input stack bar 1260. When an image is converted into a chat window with the second user according to selection of the chat window execution icon with the second user, the input stack bar 1260 is still continuously provided and an icon for automatic conversion into a chat window with the first user may be provided to an icon in the input stack bar 1260. As described above, the input stack bar 1260 provided according to the keyboard input request of the DTV may provide a UI for selection or may be continuously provided even when a mobile terminal makes keyboard input request of the DTV or executes another application that is not an application at a request acceptance time point, for example. When the keyboard input providing request of the DTV is terminated after the mobile terminal provides the input stack bar 1260, a corresponding icon 1264 may be removed, and when at least one of other icons except for an icon for a corresponding application remains on the input stack bar 1260, the input stack bar 1260 may be continuously provided. In addition, the input stack bar 1260 may be activated and provided or not only when the mobile terminal complies with the keyboard input request of the DTV. Accordingly, when the input stack bar 1260 is pre-provided on the mobile terminal, it may be sufficient that an icon is added.

FIG. 13(*a*) illustrates the case in which a mobile terminal provides an input stack bar, as in FIG. 12(*b*). In this case, the mobile terminal may provide an icon 1310 of a corresponding application differentially from another icon 1320 in order to indicate an application for which a current keyboard in the input stack bar is used. As described above, conversion between a keyboard for a corresponding message application for keyboard input and a keyboard for a DTV may be performed by selecting an icon on the input stack bar in a mobile terminal to which the input stack bar is provided. However, the present invention is not limited thereto, and as illustrated in FIG. 13(*a*), keyboard input may be converted via right and left swipe, flipping, and so on while a user touches a region to which key buttons of a keyboard are provided or any region.

In FIG. 13(*a*), when a DTV keyboard input icon 1320 in the input stack bar is selected or a key button region of a keyboard is swiped right and left as described above, the mobile terminal may change a chat window or a chat window 1350 as illustrated in FIG. 13(*b*) and an icon may be provided such that a currently executed keyboard input is also identified for keyboard input for the DTV in the input stack bar (1360). A keyboard 1370 may also be adjusted in terms of its arrangement, size, color, kind, type, attributes, and so on according to a DTV input and provided.

In the above case, a chat window may provide phoneme or vowel according to simple key button selection of a keyboard of a user but may provide various information items such as an image, a text, and audio about an application that is currently provided in the DTV. When an image of the mobile terminal is entirely or partially changed in a state for an input of the DTV, the provided keyboard may be converted in the form of a remote controller key including a functional key, etc. for the DTV according to the selection (e.g., this conversion may be performed in a similar manner to the aforementioned keyboard input conversion method) so as to change a channel or a volume of the directly connected DTV.

As illustrated in FIG. 13(*b*), when a mobile terminal is converted into a state for keyboard input for a DTV, the DTV may notify a user of the conversion so as to allow the user to recognize the conversion, receive key button input data of the mobile terminal keyboard, and output phoneme or vowel data corresponding to the key button input data on a screen of the DTV, as illustrated in FIG. 14. Although FIG. 14 illustrates the case in which a keyboard is also provided on the screen of the DTV, when the mobile terminal is converted into a state for keyboard input, a keyboard being provided on the screen of the DTV may not be output. In addition, even if the input selects phoneme or vowel through text in a mobile terminal, the DTV may convert the text in the form of text to speech (TTS) to provide voice or vice versa (e.g., speech to text (STT)).

Although not illustrated, according to the present invention, keyboard input provided by the DTV and keyboard input of the mobile terminal may coexist and may be operated together. For example, in general, it is difficult to simultaneously provide all phoneme or vowel or number data during keyboard provision, a keyboard image may be converted and selected via a separate keyboard input in the case of number or special letters and, thus, the number or special letters may be provided only in a keyboard of the mobile terminal and phoneme or vowel such as the other texts may be input through a keyboard of the DTV. In this case, the keyboard of the corresponding device may be provided by arranging key buttons of the keyboard. In addition, since Korean and English cannot be simultaneously provided through a keyboard and are input by changing a language system via a predetermined key button input in the keyboard, a user may go through inconvenience of conversion a plurality number of times when one sentence is typed and, thus, one device may provide a keyboard obtained by arranging only key buttons according to the Korean language system and another device may provide a keyboard obtained by arranging only key buttons according to the English language system. However, as described above, even a keyboard obtained by arranging different key buttons according to a device may not be fixed, can be converted into arrangement of different key buttons, and may overlap an input of another device. As described above, in the overlapping case, keyboard input of a device with high priority may be preferentially input according to key button input priority. When input priority of the mobile terminal is determined, phoneme or vowel data, etc. corresponding to key buttons input through the mobile terminal may be started in a text window of the DTV so as not to be directly differentiated. However, in this case, the phoneme or vowel data, etc. may be processed so as to be differentiated in a text window of the mobile terminal so as to prevent key input data from being directly exposed through the mobile terminal of the user without user inconvenience, or vice versa.

Operations may be basically performed in an order illustrated in FIGS. 7 to 14 and described in the specification but an order of one or more operations may be changed according to a system or a situation and the operations may be performed in the changed order and/or some operations may be skipped or some operations that are not illustrated may be further performed. Although the diagrams are separately described, one or more operations illustrated in the diagrams may be combined and performed as an operation associated with the present invention.

Accordingly, according to the aforementioned various embodiments of the present invention, when keyboard input of the DTV is inconvenient, the DTV may be controlled simply via an input of the mobile terminal, keyboard input may be adaptively processed according to application attributes, use authority, a state of the mobile terminal, etc., and the keyboard can be input while minimizing intervention in use of an application that is pre-executed in a mobile terminal.

The digital device and a method of processing data in the digital device according to the present specification are not limited to the configurations and methods of the above-described embodiments. That is, the above-described embodiments may be partially or wholly combined to make various modifications.

The operating method of the digital device proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

The present invention may have the following advantages.

According to an embodiment among various embodiments of the present invention, when keyboard input of a DTV is inconvenient, the DTV may be controlled via a simple input of a mobile terminal.

According to another embodiment among various embodiments of the present invention, keyboard input may be adaptively processed according to application attributes, use authority, a state of a mobile terminal, etc.

According to another embodiment among various embodiments of the present invention, keyboard input can be performed while minimizing intervention in use of an application that is pre-executed in a mobile terminal.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to a digital device and a method of processing data in the digital device that substantially obviates one or more problems due to limitations and disadvantages of the related art.

An object of the present invention is to control a digital TV via a simple input of a mobile terminal when keyboard input of the digital TV is inconvenient to input a keyboard.

Another object of the present invention is to adaptively process keyboard input according to application attributes, use authority, a state of a mobile terminal, etc.

A further object of the present invention is to input a keyboard while minimizing intervention in use of an application that is pre-executed in a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital device and a method of processing data in the digital device are disclosed.

In an aspect of the present invention, a method of processing data in a digital device includes executing an application, receiving a signal for requesting a keyboard, transmitting a first control command for requesting the external device for keyboard input data, if it is paired with an external device having a high priority related to providing a keyboard more than the digital device, receiving and outputting keyboard input data generated by the external device, performing an operation based on the output keyboard input data, and terminating keyboard input.

In another aspect of the present invention, a digital device includes a user interface (UI) for receiving a signal for executing an application and a signal for requesting to provide a keyboard during execution of the application, a controller for transmitting a first control command for requesting the external device for keyboard input data, if it is paired with an external device having a high priority related to providing a keyboard more than the digital device, outputting keyboard input data received from the external device in response to the first control command, controlling an operation based on the output keyboard input data, and controlling the keyboard input termination, and an output unit for outputting text data corresponding to an application execution image and text data corresponding to the received keyboard input data.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of processing data in a digital device, the method comprising:
   executing, via a controller, an application;
   receiving, via a user interface (UI), a signal for requesting a keyboard;
   when the digital device is paired with an external device having a higher priority of keyboard provision than the digital device, transmitting, via the controller, a first control command for requesting keyboard input data to the external device;
   receiving, via the controller, keyboard input data from the external device;
   outputting, via an output unit, the keyboard input data from the external device;
   performing, via the controller, an operation based on the output keyboard input data; and
   terminating, via the controller, keyboard input,
   wherein the controller identifies a user and determines a keyboard provision request authority of the identified user, and
   wherein the controller identifies attributes of the application, determines whether a single keyboard or a multiple keyboard needs to be provided based on the identified attributes, and transmits the first control command to one or more external devices based on the determination.

2. The method according to claim 1, further comprising:
   receiving, from the external device, state data of the external device; and
   transmitting a second control command for control of providing the keyboard of the external device based on the received state data of the external device.

3. The method according to claim 2, wherein the state data of the external device includes at least one of:
   identification data for identifying whether an external device is currently in a sleep state,
   identification data for identifying whether an application is currently being executed in the external device, and
   identification data for identifying whether an executed application is a foreground application or a background application.

4. The method according to claim 1, further comprising:
   outputting a list of paired external devices;
   obtaining priority data related to providing the keyboard;
   identifying an external device with higher priority for providing a keyboard than the digital device from the list of the external devices based on the obtained priority data; and
   determining whether the identified external device is positioned within a predetermined range of the digital device.

5. The method according to claim 4, wherein, when the external device is not within the predetermined range, at least one of repetition of a pairing operation a predetermined number of times until an external device with higher priority within the predetermined range than the digital device is identified and transmitting data about an application currently executed in the digital device in the first control command to the identified external device is performed.

6. The method according to claim 1, wherein determining of the keyboard provision request authority of the identified user includes determining use authority of the identified user based on at least one of time information and attributes of a currently executed application; and
   when preset authority data is not proper as the determination result, a use authority check request signal of the identified user is transmitted to a pre-stored external device.

7. The method according to claim 1, wherein, when a predetermined application is pre-executed and a keyboard for the predetermined application is provided during reception of the first control command, the external device provides a user interface (UI) according to reception of the first control command, provides an input stack bar according to user selection through the provided UI, provides a conversion icon for conversion between the pre-provided keyboard and a keyboard for the pre-provided digital device, changes a window for the application according to selection of the conversion icon, and outputs application data that is being executed by the digital device.

8. The method according to claim 1, wherein:
   the digital device is a digital TV; and
   the external device is a mobile terminal.

9. A digital device comprising:
a user interface (UI) configured to receive a signal for executing an application and a signal for requesting to provide a keyboard during execution of the application;
a controller configured to:
    transmit a first control command for requesting keyboard input data to an external device when the digital device is paired with the external device having a higher priority of keyboard provision than the digital device,
    output keyboard input data received from the external device in response to the first control command,
    control an operation based on the output keyboard input data, and
    control the keyboard input termination; and
an output unit configured to output text data corresponding to an application execution image and text data corresponding to the received keyboard input data,
wherein the controller identifies a user and determines a keyboard provisions request authority of the identified user, and
wherein the controller identifies attributes of the application, determines whether a single keyboard or a multiple keyboard needs to be provided according to the identified attributes and transmits the first control command to one or more external devices.

10. The digital device of claim 9, wherein the controller transmits a second control command for providing the keyboard of the external device based on state data of the external device received from the external device.

11. The digital device of claim 10, wherein the state data of the external device from the external device includes at least one of:
    identification data for identifying whether an external device is currently in a sleep state,
    identification data for identifying whether an application is currently being executed in the external device, and
    identification data for identifying whether an executed application is a foreground application or a background application.

12. The digital device of claim 9, wherein the controller outputs a list of paired external devices, obtains priority data related to providing the keyboard from a memory, identifies an external device with higher priority for providing a keyboard than the digital device from the list of the external devices based on the obtained priority data, and determines whether the identified external device is positioned within a predetermined range of the digital device.

13. The digital device of claim 12, wherein, when the external device is not within the predetermined range, the controller performs at least one of repetition of a pairing operation a predetermined number of times until an external device with higher priority within the predetermined range than the digital device is identified and transmitting data about an application currently executed in the digital device in the first control command to the identified external device.

14. The digital device of claim 9, wherein the controller determines use authority of the identified user based on at least one of time information and attributes of a currently executed application and when preset authority data is not proper as the determination result, the controller transmits a use authority check request signal of the identified user to a pre-stored external device.

15. The digital device of claim 9, wherein, when a predetermined application is pre-executed and a keyboard for the predetermined application is provided during reception of the first control command, the external device provides a user interface (UI) according to reception of the first control command, provides an input stack bar according to user selection through the provided UI, provides a conversion icon for conversion between the pre-provided keyboard and a keyboard for the pre-provided digital device, changes a window for the application according to selection of the conversion icon, and outputs application data that is being executed by the digital device.

16. The digital device of claim 9, wherein:
the digital device is a digital TV; and
the external device is a mobile terminal.

* * * * *